US007366656B2

(12) United States Patent
Furst-Yust et al.

(10) Patent No.: US 7,366,656 B2
(45) Date of Patent: Apr. 29, 2008

(54) METHOD APPARATUS AND SYSTEM FOR PROCESSING ACOUSTIC SIGNALS

(75) Inventors: Miriam Furst-Yust, Haifa (IL); Azaria Cohen, MaAle Levona (IL); Vered Weisz, Yahud (IL)

(73) Assignee: Ramot At Tel Aviv University Ltd., Tel-Aviv (IL)

( * ) Notice: Subject to any disclaimer, the term of this patent is extended or adjusted under 35 U.S.C. 154(b) by 275 days.

(21) Appl. No.: 10/545,683

(22) PCT Filed: Feb. 19, 2004

(86) PCT No.: PCT/IL2004/000160

§ 371 (c)(1),
(2), (4) Date: Aug. 15, 2005

(87) PCT Pub. No.: WO2004/075162

PCT Pub. Date: Sep. 2, 2004

(65) Prior Publication Data

US 2006/0253278 A1     Nov. 9, 2006

Related U.S. Application Data

(60) Provisional application No. 60/448,100, filed on Feb. 20, 2003.

(51) Int. Cl.
*G06F 17/20* (2006.01)
*G10L 19/06* (2006.01)
(52) U.S. Cl. .................... 704/200.1; 704/209
(58) Field of Classification Search ............ None
See application file for complete search history.

(56) References Cited

U.S. PATENT DOCUMENTS

| 4,536,844 A  * | 8/1985 | Lyon .................. 607/56 |
| 5,381,512 A  * | 1/1995 | Holton et al. .......... 704/200.1 |
| 5,388,182 A | 2/1995 | Benedetto et al. |
| 6,732,073 B1 * | 5/2004 | Kluender et al. ........ 704/233 |
| 2003/0012391 A1 | 1/2003 | Armstrong et al. |

FOREIGN PATENT DOCUMENTS

| FR | 2801717 | 1/2001 |
| WOPCT | WO 2004/0175162 | 2/2004 |

OTHER PUBLICATIONS

Kurnar et al. "An Analog VLSI Architecture for Auditory Based Feature Extraction", Acoustics, Speech, and Signal Processing, IEEE International Conference, Munich/Germany, IEEE Comput. Soc., p. 4081-4084, 1997. Abstract.

(Continued)

*Primary Examiner*—David Hudspeth
*Assistant Examiner*—Matthew J Sked

(57) ABSTRACT

A method of identifying patterns in a digitized acoustic signal is disclosed. The method comprises: (i) converting the digitized acoustic signal into a spatial representation being defined by a plurality of regions on a vibrating membrane, each the regions having a different vibration resonance, each the vibration resonance corresponding to a different frequency of the acoustic signal; (ii) iteratively calculating a weight function, the weight function having a spatial dependence being representative of acoustic patterns of each region of the plurality of regions; and (iii) using the weight function for converting the spatial representation into a reconstructed acoustic signal; thereby identifying the patterns in the acoustic signal.

39 Claims, 13 Drawing Sheets

OTHER PUBLICATIONS

Ambikairajah et al. "An Adaptive Cochlear Model for Speech Recognition", Instituto Int. Communicazioni, p. 1331-1334, 1991.
Weisz et al. "Reconstruction of Noisy Speech Signals Based on Cochlear Model", 26th Annual Midwinter Research Meeting of the Association for Research in Otolaryngology, 2003. Abstract.
Allen et al. "Micromechanical Models of the Cochlea", Physics Today, p. 40-47, 1992.
Boothroyd "Development in Speech Audiometry", British Journal of Audiometry (Formerly: Sound), 2: 3-10, 1967.
Carney "Spatiotemporal Encoding of Sound Level: Models for Normal Encoding and Recruitment of Loudness", Hearing Research, 76: 31-44, 1994.
Dallos "Outer Hair Cells: The Inside Story", Annals in Otology, Rhinology & Laryngology, 106: 16-22, 1997.
Furst et al. "A Cochlear Nonlinear Transmission-Line Model Compatible With Combination Tone Psychophysics", The Journal of the Acoustical Society of America, 72(3): 717-726, 1982.
Goldstein "Exploring New Principles of Cochlear Operation: Bandpass Filtering by the Organ of Corti and Additive Amplification by the Basilar Membrane", Biophysics of Hair Cell Sensory System, p. 315-322, 1993.
Housley et al. "Ionic Currents of Outer Hair Cells Isolated From the Guinea-Pig Cochlea", Journal of Physiology, 448: 73-98, 1992.
Jerry et al. "Outer Hair Cell Length Changes in An External Electric Field. II. The Role of Electrokinetic Forces on the Cell Surface", The Journal of the Acoustical Society of America, 98(4): 2011-2017, 1995.
Dallos et al. "High-Frequency Motility of Outer Hair Cells and the Cochlear Amplifier", Science, 267(5206): 2006-2009, 1995.
Faires et al. "Numerical Analysis. Table of Contents", Brooks/Cole, 2 P., 1997.
He et al. "Properties of Voltage-Dependent Somatic Stiffness of Cochlear Outer Hair Cells", JARO (Journal of the Association for Research in Otolaryngology), 01: 064-081, 2000.
Furst "Manifestations of Intense Noise Stimulation on Spontaneous Otoacoustic Emission and Threshold Microstructure: Experiment and Model", The Journal of the Acoustic Society of America, 91(2): 1003-1014, 1992.
Heinz et al. "Auditory Nerve Model for Predicting Performance Limits of Normal and Impaired Listeners", ARLO (Acoustic Research Letters Online), 2(3): 91-96, 2001.
Iserles "A First Course in the Numerical Analysis of Differential Equations", Cambridge University Press, 5 P., 1997.
Kates "A Time-Domain Digital Cochlear Model", IEEE Transactions on Signal Processing, 39(12): 2573-2592, 1991.
Liberman et al. "Acute Ultrastructural Changes in Acoustic Trauma: Serial-Section Reconstruction of Stereocilia and Cuticular Plates", Hearing Research, 26: 45-64, 1987.
Lukashkin et al. "The Voltage Dependence of the Transducer May Modify Outer Hair Cell Motility", British Journal of Audiology, 31: 85-86, 1997.
Maison et al. "Predicting Vulnerability to Acoustic Injury With A Noninvasive Assay of Olivocochlear Reflex Strength", The Journal of Neuroscience, 20(12): 4701-4707, 2000.
Mountain "A Piezoelectric Model of Outer Hair Cell Function", The Journal of the Acoustic Society of America, 95(1): 350-354, 1994.
Nobili et al. "How Well Do We Understand the Cochlea?", TINS (Trends in Neurosciences), 21(4): 159-167, 1998.
Pickles "An Introduction to the Physiology of Hearing", Academic Press, 2nd Ed., 4 P., 1982.
Purdy et al. "Normative Data for the New Zealand Recording of the CVC (Revised AB) Word Lists", New Zealand Audiological Society, Bulletin, 10(2): 20-29, 2000.
Rattay et al. "The Mammalian Auditory Hair Cell: A Simple Electric Circuit Model", The Journal of the Acoustic Society of America, 103(3); 1558-1565, 1998.
Sachs et al. "Stochastic Models for Mechanical Transduction", Biophysical Journal, 59: 1143-1145, 1991.
Saunders et al. "The Anatomical Consequences of Acoustic Injury: A Review and Tutorial", The Journal of the Acoustic Society of America, 78(3): 833-847, 1985.
Spector "On the Mechanoelectrical Coupling in the Cochlear Outer Hair Cell", The Journal of the Acoustic Society of America, 107(3): 1435-1441, 2000.
Ulfendahl "Mechanical Esponses of the Mammalian Cochlea", Progress in Neurobiology, 53: 331-380, 1997.
Zweig et al. "The Cochlear Compromise", The Journal of the Acoustic Society of America, 59(4): 975-982, 1976.
Zwislocki "Theory of the Acoustical Action of the Cochlea", The Journal of the Acoustical Society of America, 22(6): 778-784, 1950.

* cited by examiner

Fig. 2a
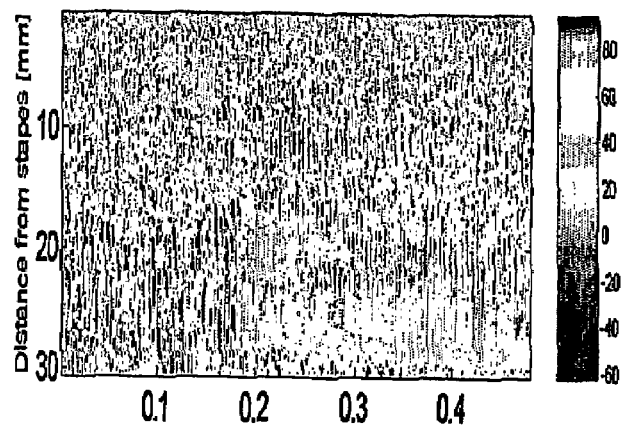
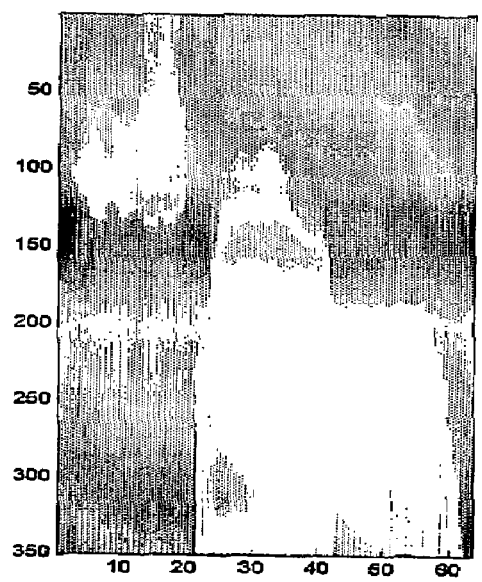
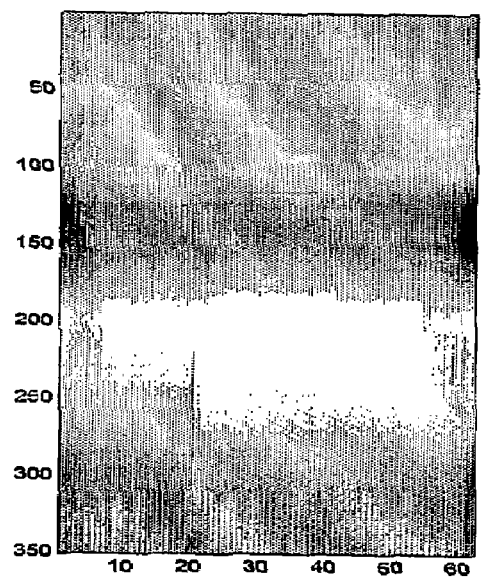
Fig. 2b
Fig. 2c

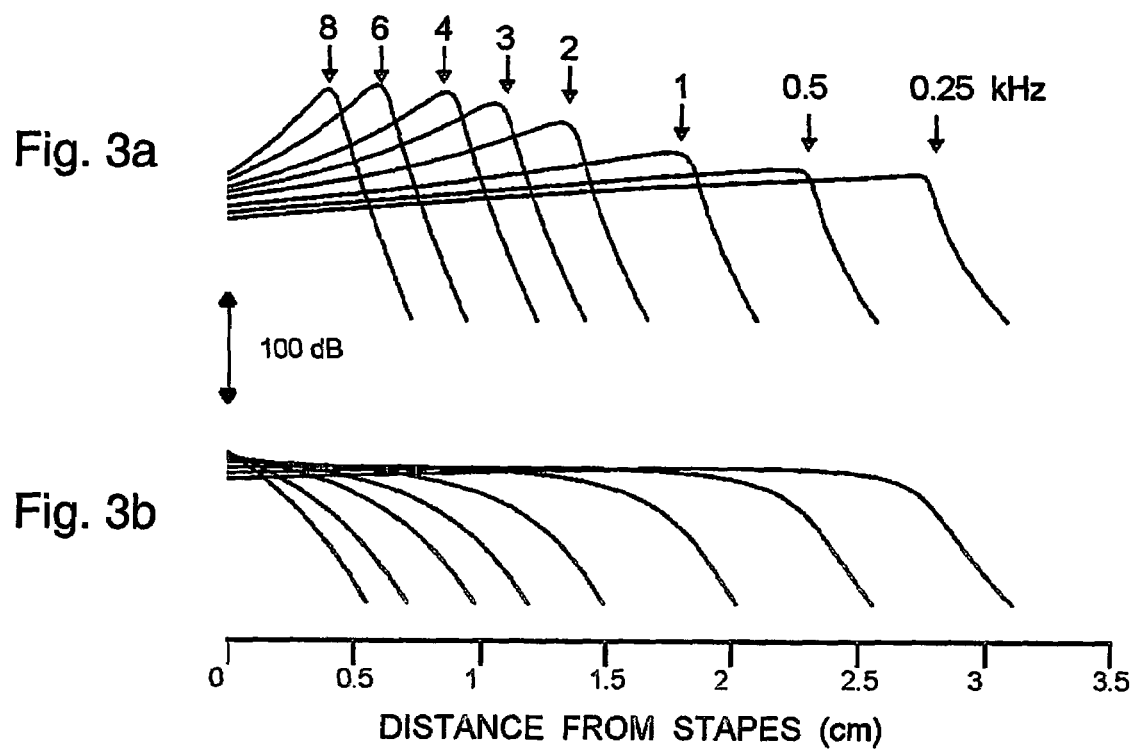

METHOD APPARATUS AND SYSTEM FOR PROCESSING ACOUSTIC SIGNALS

RELATED PATENT APPLICATION

This application is a National Phase Application of PCT/IL2004/000160 having International Filing Date of 19 Feb. 2004, which claims the benefit of U.S. Provisional Patent Application No. 60/448,100, filed 20 Feb. 2003. The contents of the above Application are all incorporated herein by reference.

FIELD AND BACKGROUND OF THE INVENTION

The present invention relates to digital processing of acoustic signals and, more particularly, to a method, apparatus and system for determining patterns and improving signal-to-noise ratio in acoustic signals.

Sound is generated by mechanical vibrations, which set up small oscillations of molecules of the physical medium in which the mechanical vibrations occur. The oscillations of molecules alter the distance between adjacent molecules of the medium, thereby also the local pressure therein. Specifically, when the distance between adjacent molecules becomes smaller, the pressure increases (compression) and when this distance becomes larger the pressure decreases (rarefaction). Thus, sound is a pressure wave propagating through the physical medium.

The velocity of sound depends on the density of the medium through which it propagates. Sound waves therefore travel fastest in solids, slower in liquids, slowest in air, and cannot propagate in vacuum. Sound vibrations extend from a few cycles per second (Hz) to millions of Hz. Human healing is limited to a range of between about 20 to 20,000 Hz. Other mammals can hear ultrasound, some such as whales approach 100,000 Hz.

The task of all hearing organs of a mammal is to analyze environmental sounds and transmit the results of that analysis to the brain which interprets the hearing organs output. All sensory organs have specialized sensory cells which convert an environmental signal into a type a neural code in a form of electrical energy transmitted to the brain. In case of acoustic environmental signal, it is the human auditory system which converts the pressure wave of the sound to the neural code.

The auditory system generally includes the external ear canal, the eardrum, the auditory ossicle, the cochlea which includes the inner and outer hair cells, nerves and brain cells. The external ear canal and eardrum are called the outer ear, the eardrum and auditory ossicle are called the middle ear and the cochlea and hair cells are called the inner ear.

The outer portion of the external ear reflects sound towards the ear canal where the pressure waves are aligned so as to strike the ear drum at right angles. The middle ear bones generate a pressure increment and conduct sound from the ear drum to the cochlea present in the inner ear. The pressure increment is necessary to maximize the sound energy that gets to the inner ear. The inner ear serves as a spectrum analyzer which determines the amount of energy contained at the different frequencies that make up a specific sound. The cochlea includes membranes designed to be sensitive to different frequencies at a different locations thereof. Each individual location transmits information to the brain, so that an increase in activity from one location is interpreted as an increased energy at the respective frequency. The human ear thus encodes the frequency information by mapping a spectral representation onto a spatial representation.

Decades of extensive studies of cochlear functions yielded a reasonable understanding of the acoustic-to-neural transduction of the inner ear. In recent years a significant progress has been made in understanding the contribution of the mammalian cochlear outer hair cells to the normal auditory signal processing. The outer hair cells act as local amplifiers, which are metabolically activated. The motion of the outer hair cells is believed to dynamically change the basilar membrane mechanical response [to this end see, e.g., Dallos P., "Outer hair cells: The inside story," Ann Otol. Laryngol., 1997, 106, 16-22]. Some psychoacoustical properties as suppression and combination tones on one hand, and otoacoustic emissions phenomena on the other hand are result of the outer hair cells activity.

Models that described the outer hair cell activity assume that that the outer hair cells cilia displacement generates force that act on the basilar membrane. For further details see, e.g., Allen and Neely, "Micromechanical models of the cochlea," Physics Today, 1992, 40-47; Mountain, D. C. and Hubbard, A. E., "A piezoelectric model for outer hair cell function," J. Acoust. Soc. Am., 1994, 95: 350-354; Dallos P. and Evans B. N., "High-frequency motility of outer hair-cells and the cochlear amplifier," Science, 1995, 267: 2006-2009; Rattay F., Gebeshuber and Gitter A. H., "The mammalian auditory hair cell: A simple electric circuit model," J. Acout. Soc. Am, 1998, 105:1558-1565; Dallos P., "Properties of voltage dependant somatic stiffness of cochlear outer hair cell," JARO, 2000, 01:064-081; and Spector A. A, "On the mechanoelectrical coupling in the cochlear outer hair cell," J. Acout. Soc. Am, 2000, 107:1435-1441.

Hearing impairment occurs when any of the functions of the auditory system is diminished and the symptoms, as well as possible treating methods, vary depending on which function is diminished and to what extent. Models based on outer hair cell activity predict normal behavior and degradation in the performances due to outer hair cell loss [see, e.g., Kates J M., "A time domain digital cochlear model," IEEE Trans. Signal Processing, 1991, 39:2573-2592; Goldstein J. L., "Exploring new principles of cochlear operation: bandpass filtering by the organ of corti and additive amplification in the basilar membrane," Biophysics of Hair Cell Sensory System, edited by Duiffhuis H. Horst J. W., van Dijk P. and van Netten S. M., 1993, Singapore, World Scietific, 315-322; Carney L. H., "Spatiotemporal encoding of sound level: Models for normal encoding and recruitment of loudness," Hearing Research, 1994, 76, 31-44; and Heinz et al., "Auditory nerve model for predicting performance limits of normal and impaired listeners," JARO, 2001, 2:91-96].

Typically, hearing loss depends on the sound level and frequency. For example, a person suffering from hearing impairment may not be able to hear sound below a specific sound level threshold, and have a normal hearing capability above another specific sound level threshold. A person suffering from hearing impairment may also experience a reduced capability of hearing a certain range of frequencies.

Many hearing aid devices and methods have been developed over the years to compensate hearing impairment. Hearing aids are utilized in a variety of auditory situations and must communicate acoustic stimuli to the user that are appropriate for the situation. For example, in street traffic the wearer wants an omni-directional sound perception for perceiving danger but would like to experience a directed sound perception in a conversation with a conversation partner. Moreover, low-noise telephoning should be possible for the hearing aid user with hard-wired, cordless or cellular telephones.

The most simple hearing aid device provides a natural sound perception, when the gain is adjusted to the actual listening situation or sound environment, but would require continuously repeated adjustment of the gain to the actual situation, whereby operation of the hearing aid will become complicated and cumbersome. As a result, hearing aids of this type are frequently not adjusted to an optimum sound perception for the actual listening situation.

Also known are hearing aids having different hearing programs designed for responding to different auditory situations. In these hearing aids the user switches between the different operation modes, according to the particular auditory situations in which he is present. A typical hearing program is the telephone hearing program where the acoustic signals that the microphone of the hearing aid picks up are filtered according to the spectrum of telephone signals in order to suppresses unwanted ambient noises in other spectral ranges. High-quality hearing aid devices usually have a number of microphones that can be interconnected by a specific hearing program in order to achieve a directional effect.

Manual switching of the hearing aid to different operation mode causes discomfort to the user and may also be impossible, for example, hearing aid devices which are located in the external ear or even exclusively in the auditory canal.

Other hearing aids have automatic gain control which provides automatic adaptation to different sound environments and an improved sound perception, in particular at low sound levels. However, the performance of such devices is far from being sufficient. In particular, such automatic gain control devices typically provide a higher amplification of low sound levels, which are known to contain a substantial amount of noise, hence cause a serious discomfort to the user.

Complicated systems and apparati which are capable of improving signal-to-noise ratio have also been developed. These technologies generally include a plurality of sensors which collect information from a plurality of directions. Assuming that the sound wave source (e.g., a speaker) has a well-defined location in space, the apparatus amplifies signals originating from one (or a few) direction and suppress omni-directional signals.

For example, one such apparatus improve the signal-to-noise ratio using remote microphones and receivers to separate the speaker's voice from the background noise.

Another system is disclosed in U.S. Application No. 20030012391. In this system a front microphone receives acoustical signal and generates an analog signal. A rear microphone also receives an acoustical signal and generates an analog signal. The two analog signals are converted into digital domain, and transmitted to a sound processor which selectively modifies the signal characteristics and generates a processed signal. The processed signal is converted by a speaker to an acoustical signal which is directed into the ear canal of the user. A directional processor and a headroom expander optimize the gain applied to the acoustical signals and combine the amplified signals into a directionally-sensitive response.

Being based on a plurality of sufficiently spaced-apart sensors, the above systems and apparati are rather bulky and have to be carried separately by the user, thus causing a discomfort and embarrassment to the user.

Beside hearing aids, development and widespread deployment of digital communication systems have brought increased attention to the role of digital signal processing. Generally, digital processing methods are based on speech enhancement algorithms which improve some perceptual aspects of speech so that it may be better exploited by other processing algorithms, such as algorithms for classifying acoustic signals.

Speech enhancement algorithms have been applied to problems as diverse as correction of reverberation, pitch modification, rate modification, reconstruction of lost speech packets in digital networks, correction of speech produced by deep-sea divers breathing a helium-oxygen mixture and correction of speech that has been distorted due to pathological problems of the speaker. Algorithms for classifying acoustic signals are used in many applications. For example, acoustic pattern recognition devices, such as speech recognition devices, are embedded in electronic cards, which are designed to receive spoken commands or for identification.

Noise reduction, however, is probably the most important and most frequently encountered problem in speech enhancement and pattern recognition.

Generally there are two types of speech recognizers. A first type performs certain operations when the user gives short commands, and a second type accepts dictated speech and converts the speech as text, which is displayed on a display device.

Most speech recognizers must be trained by the user before they can recognize words or phrases spoken by the user. The speech recognizer must be trained by the user's voice before the recognizer can interpret user words and commands. Training a speech recognizer requires a user to speak certain words or phrases into the recognizer, usually many times, so that the speech recognizer can recognize the user's speech pattern. Later when the user is using the speech recognizer, the speech recognizer will compare the input voice signal with various stored speech templates to find a template that most resembles the input voice signal.

A user will generally "train" a speech recognizer in an environment that has relatively low interfering noise. Subsequently, most speech recognizers must be used in environments of low interfering noise. Otherwise, the speech recognizer will not be able to separate spoken words from background noise. Where speech recognizers are used in low noise environments, a fairly high rate of recognition is achieved. If the speech recognizer is trained in a location having a moderate, constant background noise, and subsequently used in an environment that has the same moderate, constant background noise, a high recognition rate is achieved.

However, when these speech recognizers are used in high noise environments with negative signal-to-noise ratios and environments where the noise present is different than the background noise present in the training session, the recognition rate falls to very low, unusable accuracy levels. Conventional speech recognizers attempt to estimate the characteristics of the surrounding noise and then determine the effects on the user's voice. Various techniques are incorporated to build statistical or parametric models of the noise which are subtracted from the sound signal. These models are very inaccurate and produce a low-quality output signal.

Moreover, even in those cases where a prior art device has a certain level of success in improving the signal-to-noise ratio of a noisy input, such device fails to preserve the characteristics of a clean input signal. In other words, when the acoustic signal is produced in quiet or low-noise background, prior art devices tend to distort the signal rather then improve it.

The above problems contrast sharply with nature's outstanding acoustic processing capability.

There is thus a widely recognized need for, and it would be highly advantageous to have a method device and apparatus for processing acoustic signals, which are based on physiological principles and devoid of the above limitations.

SUMMARY OF THE INVENTION

According to one aspect of the present invention there is provided a method of identifying patterns in a digitized acoustic signal, the method comprising: converting the digitized acoustic signal into a spatial representation being defined by a plurality of regions on a vibrating membrane, each the regions having a different vibration resonance, each the vibration resonance corresponding to a different frequency of the acoustic signal; iteratively calculating a weight function, the weight function having a spatial dependence being representative of acoustic patterns of each region of the plurality of regions; and using the weight function for converting the spatial representation into a reconstructed acoustic signal; thereby identifying the patterns in the acoustic signal.

According to further features in preferred embodiments of the invention described below, the method further comprises calculating a time-delay function, the time-delay function having a spatial dependence being representative of propagation time of the acoustic signal along the vibrating membrane.

According to still further features in the described preferred embodiments the method further comprises using the time-delay function for calculating a velocity of the vibrating membrane.

According to still further features in the described preferred embodiments the step of converting the spatial representation into the reconstructed acoustic signal comprises combining the weight function and the velocity, using a predetermined arithmetic procedure.

According to still further features in the described preferred embodiments the predetermined arithmetic procedure comprises: (i) weighting the velocity by the weight function, thereby providing a weighted velocity; and (ii) integrating the weighted velocity over a surface or a length of the vibrating membrane, thereby providing the reconstructed acoustic signal.

According to still further features in the described preferred embodiments the step of conversion of the digitized acoustic signal into the spatial representation comprises calculating the vibration resonance using an anatomical model of a cochlea.

According to another aspect of the present invention there is provided a method of identifying patterns in an acoustic signal, the method comprising: digitizing the acoustic signal so as to provide a digitized acoustic signal; converting the digitized acoustic signal into a spatial representation being defined by a plurality of regions on a vibrating membrane, each the regions having a different vibration resonance, each the vibration resonance corresponding to a different frequency of the acoustic signal; iteratively calculating a weight function, the weight function having a spatial dependence being representative of acoustic patterns of each region of the plurality of regions; and using the weight function for converting the spatial representation into a reconstructed acoustic signal; thereby identifying the patterns in the acoustic signal.

According to yet another aspect of the present invention there is provided a software apparatus for identifying patterns in a digitized acoustic signal, the apparatus comprising: a first converter, for converting the digitized acoustic signal into a spatial representation being defined by a plurality of regions on a vibrating membrane, each the regions having a different vibration resonance, each the vibration resonance corresponding to a different frequency of the acoustic signal; a weight function calculator, for iteratively calculating a weight function, the weight function having a spatial dependence being representative of acoustic patterns of each region of the plurality of regions; and a second converter for converting the spatial representation into a reconstructed acoustic signal using the weight function.

According to further features in preferred embodiments of the invention described below, the apparatus further comprises a time-delay function calculator, for calculating a time-delay function, the time-delay function having a spatial dependence being representative of propagation time of the acoustic signal along the vibrating membrane.

According to still further features in the described preferred embodiments the apparatus further comprises electronic-calculation functionality for calculating a velocity of the vibrating membrane using the time-delay function.

According to still another aspect of the present invention there is provided a system for identifying patterns in an acoustic signal, the system comprising: (a) an analog-to-digital unit for digitizing the acoustic signal so as to provide a digitized acoustic signal; and (b) a processor, communicating with a memory unit having therein a software apparatus, the software apparatus being designed to convert the digitized acoustic signal into a spatial representation, iteratively calculate a weight function and convert the spatial representation into a reconstructed acoustic signal; wherein the spatial representation is defined by a plurality of regions on a vibrating membrane, each the regions having a different vibration resonance, each the vibration resonance corresponding to a different frequency of the acoustic signal, and wherein the weight function has a spatial dependence representative of acoustic patterns of each region of the plurality of regions.

According to further features in preferred embodiments of the invention described below, the system further comprises a microphone for converting a sound wave into the acoustic signal.

According to still further features in the described preferred embodiments the system further comprises a digital-to-analog unit for converting the reconstructed signal into an analog electrical signal.

According to still further features in the described preferred embodiments the system further comprises a sound wave generator for converting the analog electrical signal into a sound wave.

According to still further features in the described preferred embodiments the system further comprises a display interface for transmitting the acoustic patterns to a display device.

According to still further features in the described preferred embodiments the system serves as a component in a hearing aid system.

According to still further features in the described preferred embodiments the system serves as a component in a speech recognition system.

According to still further features in the described preferred embodiments the system serves as a component in a vocoder.

According to still further features in the described preferred embodiments the system serves as a component in a telephone device.

According to still further features in the described preferred embodiments the system serves as a component in a cellular telephone device.

According to still further features in the described preferred embodiments the processor is capable of real time calculations.

According to still further features in the described preferred embodiments the second converter is operable to combine the weight function and the velocity, using a predetermined arithmetic procedure.

According to still further features in the described preferred embodiments the second converter comprises: (i) electronic-calculation functionality for weighting the velocity by the weight function, thereby providing a weighted velocity; and (ii) an integrator for integrating the weighted velocity over a surface or a length of the vibrating membrane, thereby providing the reconstructed acoustic signal.

According to still further features in the described preferred embodiments the apparatus further comprises, an energy calculation unit for calculating an energy content of each of the plurality of regions.

According to still further features in the described preferred embodiments the apparatus further comprises a sound wave database.

According to still further features in the described preferred embodiments the first converter designed and programmed so as to calculate the vibration resonance using an anatomical model of a cochlea.

According to still further features in the described preferred embodiments the weight function is calculated using a synthetic sound wave database.

According to still further features in the described preferred embodiments the weight function is calculated using a prerecorded sound wave database.

According to still further features in the described preferred embodiments the time-delay function is calculated iteratively.

According to still further features in the described preferred embodiments the time-delay function is calculated using a synthetic sound wave database.

According to still further features in the described preferred embodiments the time-delay function is calculated using a prerecorded sound wave database.

According to still further features in the described preferred embodiments a value or a spatial dependence of the density parameter is selected such that the reconstructed signal has a predetermined threshold band.

According to still further features in the described preferred embodiments the predetermined threshold band is from about −10 dB to about 10 dB.

According to still further features in the described preferred embodiments the predetermined arithmetic procedure comprises a scalar product in the spatial representation.

According to still further features in the described preferred embodiments the weight function and the time-delay function are each independently calculated such that the signal-to-noise ratio of the reconstructed acoustic signal is larger than a signal-to-noise ratio of the acoustic signal.

According to still further features in the described preferred embodiments the weight function and the time-delay function are each independently calculated such that when the acoustic signal is substantially noise-free, the reconstructed acoustic signal is substantially similar to the acoustic signal.

According to still further features in the described preferred embodiments the weight function has substantially low values in a first portion of the plurality of regions, the first portion being corresponding to noisy components of the acoustic signal.

According to still further features in the described preferred embodiments the substantially low values approximately equals zero.

According to still further features in the described preferred embodiments the weight function has substantially high values in a second portion of the plurality of regions, the second portion being corresponding to components other than the noisy components of the acoustic signal.

According to still further features in the described preferred embodiments the method further comprises, for each of the plurality of regions, calculating an energy content of the region.

According to still further features in the described preferred embodiments the first portion of the plurality of regions is characterized by an energy content which is below a predetermined threshold.

According to still further features in the described preferred embodiments the second portion of the plurality of regions is characterized by an energy content which is above the predetermined threshold.

According to still further features in the described preferred embodiments the system further comprises a storage unit communicating with the processor, the storage unit being for storing a sound wave database.

According to still further features in the described preferred embodiments the sound wave database is selected from the group consisting of a synthetic sound wave database and a prerecorded sound wave database.

According to still further features in the described preferred embodiments the time-delay function and the weight function are each independently calculated using the sound wave database.

According to still further features in the described preferred embodiments the processor is operable to calculate the vibration resonance using an anatomical model of a cochlea.

According to still further features in the described preferred embodiments the anatomical model of the cochlea comprises a mechanical contribution and an electrical contribution.

According to still further features in the described preferred embodiments the electrical contribution mimics activity of outer hair cells of the cochlea.

According to still further features in the described preferred embodiments the electrical contribution is parameterized using a density parameter, the density parameter representing a population density of the outer hair cells on the vibrating membrane.

According to still further features in the described preferred embodiments the density parameter is uniform.

According to still further features in the described preferred embodiments the density parameter varies along the vibrating membrane.

According to still further features in the described preferred embodiments the density parameter has a random distribution along the vibrating membrane.

According to still further features in the described preferred embodiments the mechanical contribution and the electrical contribution are calculated by a mathematical procedure selected from the group consisting of a finite difference method and a finite-element method.

According to still further features in the described preferred embodiments the mechanical contribution and the electrical contribution are calculated in the time domain representation.

According to still further features in the described preferred embodiments the time domain representation comprises a plurality of time steps.

According to still further features in the described preferred embodiments for each time step of the time domain representation, a spatial dependence of the mechanical contribution and the electrical contribution is calculated by a mathematical procedure selected from the group consisting of a finite difference method and a finite-element method.

According to still further features in the described preferred embodiments a time dependence of the mechanical contribution and the electrical contribution is calculated by a mathematical procedure selected from the group consisting of an Euler method, a modified Euler method, a Runge-Kutta method, a Runge-Kutta-Fehlberg method, a Jacobi method and a Heun method.

The present invention successfully addresses the shortcomings of the presently known configurations by providing a method, apparatus and system for determining patterns and improving signal-to-noise ratio in acoustic signals far beyond prior art teachings.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2a shows a typical spatial representation of an acoustic signal, as a function of time, according to a preferred embodiment of the present invention;

FIG. 2b shows the energy content of various regions of the spatial representation of FIG. 2a, according to a preferred embodiment of the present invention;

FIG. 2c shows an energy mask of the spatial representation of FIG. 2b, using a weight function;

FIGS. 3a-b show excitation patterns of a vibrating membrane, with (FIG. 3a) and without (FIG. 3b) electrical contributions, according to a preferred embodiment of the present invention;

FIG. 9b shows audiograms corresponding to the varying density parameter of FIG. 9a;

FIG. 13a shows a time domain representation of a clean input signal;

FIG. 13b shows a time domain representation of a signal which is a reconstruction of the clean signal shown in FIG. 13a;

FIG. 13c shows a time domain representation of a noisy input signal; and

FIG. 13d shows a time domain representation of a signal which is a reconstruction of the noisy signal shown in FIG. 13c.

DESCRIPTION OF THE PREFERRED EMBODIMENTS

Figure 1:
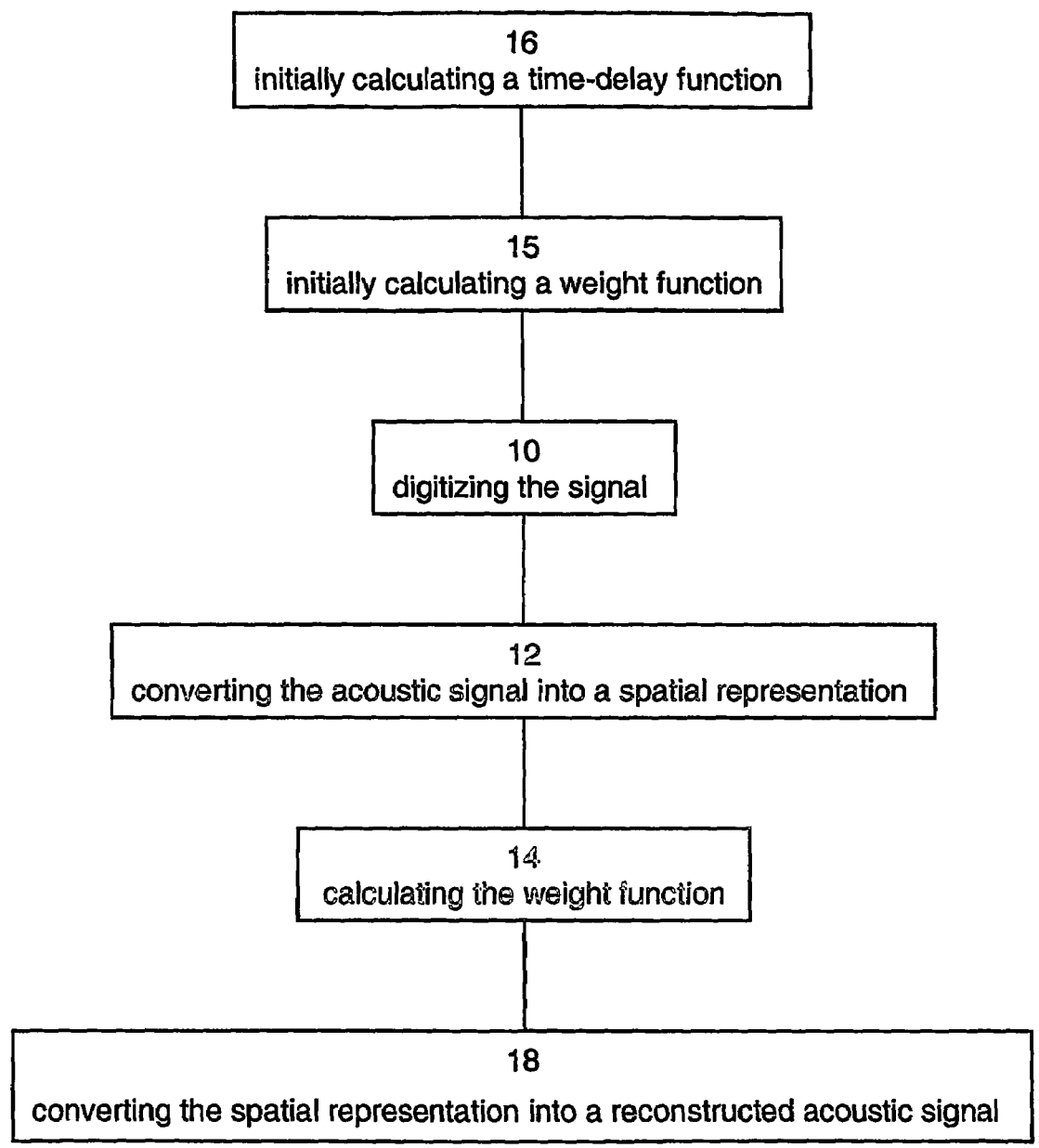
FIG. 1 is a flowchart diagram of a method of identifying patterns in an acoustic signal, according to a preferred embodiment of the present invention.

The present invention is of a method, apparatus and system for determining patterns in acoustic signals which can be used for improving the signal-to-noise ratio thereof. Specifically, the present invention can be employed in many applications, such as, but not limited to, hearing aid systems, speech recognizing systems, vocoders, telephone devices, cellular telephone devices, acoustic digital communication systems and the like.

The principles and operation of a method, apparatus and system for determining patterns in acoustic signals according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

As stated in the Background section above, the hearing organs of mammals have outstanding processing capability. The main processing of acoustic signal in mammals is performed in the cochlea, where pressure waves vibrate the basilar membrane, in accordance with its various resonance frequencies. The resonance frequency of the basilar membrane decreases as a function of the distance from its base. In other words, different portions of the basilar membrane are sensitive to different frequencies of the pressure wave generated by the eardrum. For example, the base of the basilar membrane is sensitive to high frequencies while the apex of the basilar membrane is sensitive to low frequencies.

While conceiving the present invention it has been hypothesized and while reducing the present invention to practice it has been realized that principles of the above physiological mechanism can be employed in digital processing of an acoustic signal for the purpose of identifying acoustic patterns. The identification can be according to any predetermined category. In the simplest embodiment, identification is binary, for example, identification of patterned (e.g., speech) and non-patterned (e.g., noise) components of the acoustic signal. This embodiment can thus be used for the purpose of improving a signal-to-noise ratio of the acoustic signal. In other embodiments, the identification is according to more complex categories, and can be used for example, for the purpose of speech recognition, e.g., by comparing the processed acoustic signal to a database of speech patterns.

Thus, according to one aspect of the present invention, there is provided a method of identifying patterns in an acoustic signal. The acoustic signal can have many different forms. Specifically, the acoustic signal can be represented by a spectrogram or any other digitized form, or it can be in physical form of a pressure wave propagating through a medium (e.g., air), in which case the acoustic signal is preferably digitized to form a digitized acoustic signal.

A spectrogram, as used herein, refers to any diagrammatical or virtual representation of at least a portion of the spectra of the acoustic signal. For example, when the spectrogram is presented diagrammatically, one axis (say the vertical axis) represents frequency, and another axis (say the horizontal axis) represents the time. Typically, but not obligatory, the time is displayed at a plurality of predetermined discrete intervals. The spectrogram can also be displayed in a gray-scale or color rendition, where the darkness or color of a given point on the spectrogram is representative of the energy content of the respective frequency at the respective time window. The spectrogram can also be stored in a memory medium, for example, as a two-dimensional array of acoustic energy values.

Referring now to the drawings, the method of the present embodiment of the invention comprises the following method steps which are illustrated in the flowchart of FIG. 1.

Hence, a step designated in FIG. 1 by Block 12, the digitized acoustic signal is converted into a spatial representation. The spatial representation is defined by a plurality of regions on a vibrating membrane, such that each region has a different vibration resonance, similarly to the properties of the inner ear's basilar membrane as further detailed hereinabove. Each vibration resonance of the vibrating membrane corresponds to a different frequency of the acoustic signal. As different regions of the membrane have different vibration resonances, a spatial representation is thus formed in which each frequency is mapped onto a specific spatial location.

It is to be understood, the use of the term "vibrating membrane" is for illustrative purposes only and it is not intended to limit the scope of the present invention to the physical use of a vibrating membrane, although such use is not excluded. One ordinarily skilled in the art would appreciate that a spatial representation can be obtained by means other than the use of physical vibrating membrane. One way to obtain a spatial representation is using a memory medium having a plurality of addresses, where different addresses represent different spatial locations.

Optionally and preferably Block 12 is preceded by the aforementioned step of digitization. This step is designated in FIG. 1 by Block 10. The digitization can be done in any way known in the art. For example, when the acoustic signal is a physical pressure wave, the digitization can be performed using a suitable sound wave sensor (e.g., a microphone) and an analog-to-digital unit. A typical sampling rate of the digitization is from about 8 kHz to about 44 kHz.

As used herein the term "about" refers to ±10%.

In another step of the method, designated by Block 14, a weight function, $\alpha(x)$, where x is a spatial coordinate or a spatial vector in any dimensionality, is calculated. The weight function preferably has a spatial dependence which is representative of acoustic patterns of each of the region of the membrane. It is to be understood that the order in which the various steps delineated in the flowchart of FIG. 1 is not to be considered as limiting and the same steps can be executed in other execution orders. For example, the calculation of the weight function (Block 14) may be executed prior to, contemporaneously with or subsequent to the conversion step (Block 12).

According to a preferred embodiment of the present invention the calculation of the weight function is an iterative or dynamic procedure. Specifically, the weight function can be calculated more than one time. For example, an initial calculation of the weight function, designated by Block 15, can precede the conversion of the digitized signal to the spatial representation (Block 12) or before the digitization step (Block 10). Once the spatial representation is obtained the weight function can be recalculated and updated a plurality of times, using the initial or any previous calculations thereof.

The weight function is defined and calculated according to the application in which the method is employed. For example, for improving the signal-to-noise ratio of the acoustic signal, the weight function has substantially low values (e.g., zero) in regions corresponding to noisy components of the acoustic signal, and substantially higher values in regions corresponding to components which are not noisy. This can be done, for example, by determining the energy content of each region, and determining, based on the energy content, whether or not the respective region represents a noisy component. This determination can be done by a calibration table, a calibration curve, a synthetic database, a prerecorded database, a predetermined threshold and the like. A preferred mathematical expression for the energy content is given hereinunder in the Examples section that follows (see Equation 38).

Reference is now made to FIGS. 2a-c which exemplify the use of a predetermined threshold, according to a preferred embodiment of the present invention. FIG. 2a shows a typical spatial representation of an acoustic signal, as a function of time, FIG. 2b show the energy content of various regions of the spatial representation in color rendition and FIG. 2c show the use of the weight function for masking the spatial representation, where a low weight is assigned to noisy regions and a high weight is assigned to non-noisy regions.

In the example shown in FIGS. 2a-c, a threshold of about 60 dB has been set to determine whether a region is noisy or non-noisy. In this example, all regions having energy lower than the 60 dB threshold were identified as noisy and all regions having energy higher this threshold were identified as noisy. In FIG. 2c, an energy mask of about 90 dB to the non-noisy regions and about −60 dB to the noisy regions was employed. It is to be understood, that the above numerical values are not to be considered as limiting and other thresholds and energy masks can be employed.

Referring again to FIG. 1, in an optional and preferred step, designated by Block 16, a time-delay function, $\hat{t}(x)$, is calculated. $\hat{t}(x)$ preferably represents the propagation time of the acoustic signal along the vibrating membrane. As different regions of the vibrating membrane have different vibrating resonances, different components of the acoustic signal have different propagation times along the membrane, which propagation times depend on the velocity of the acoustic signal, the frequency of the specific component and the location of the respective region on the membrane.

The time-delay function is initially calculated using a synthetic or prerecorded to database, in which case the calculation can be executed before the conversion step or the digitization step, if a digitization is employed.

In an additional step of the method, represented by Block 18, the weight function and/or the time-delay function is used for converting the spatial representation into a reconstructed acoustic signal, $\hat{S}(t)$, where t is a time variable. The conversion of the spatial representation is preferably done by reversing the process of constructing thereof. Once reconstructed, the acoustic signal can be used for generating a physical pressure wave, for example, using a suitable digital-to-analog unit followed by sound wave generator, e.g., a speaker.

According to a preferred embodiment of the present invention the reconstructed acoustic signal is calculated by combining the weight function and the velocity, v, of the vibrating membrane, calculated at time point $t+\hat{t}_d(x)$. This can be done by calculating a scalar product between the weight function and the velocity in the spatial representation. Mathematically, there are many ways to define a scalar product. In one such definition, the scalar product between two quantities equals the integral of their multiplication over the region in which they are defined.

Thus, according to the presently preferred embodiment of the invention the reconstructed acoustic signal can be written in the form:

$$\hat{S}(t) = \int_0^L \hat{\alpha}(x) \cdot v(t + \hat{t}_d(x)) dx \qquad (EQ. 1)$$

where L is length of the vibrating membrane. A typical value for L, is, without limitation, about 35 mm. It is to be understood that the dimension of the integration of Equation 1 depends on the dimensionality of the spatial coordinate or vector x. Specifically, the integral in Equation 1 can have any dimensionality, such as, but not limited to, a linear integral or a surface integral.

As further exemplified in the Examples section that follows, a proper calculation of the velocity, v, together with a judicious selection of the weight function, $\alpha(x)$ and the time-delay function, $\hat{t}(x)$, allows for a significant improvement of the signal-to-noise ratio of the reconstructed signal, relative to the signal-to-noise ratio of the original signal. Furthermore, unlike prior art methods and systems which tend to distort a noise-free signal, the method of the present invention preferably preserves the original signal when no or small noise levels are present.

There are many models for calculating a velocity of a vibrating membrane, all of which are contemplated in the present embodiment for constructing the spatial representation and calculating v. The motivation for such representation is based, as stated, on the outstanding acoustic processing capability of the cochlea. Thus, according to a preferred embodiment of the present invention, the conversion of the digitized acoustic signal into spatial representation is done by a suitable anatomical model of a cochlea.

The anatomical model preferably comprises a mechanical contribution, P, and an electrical contribution, $P_{OHC}$, representing, respectively the mechanical properties of the basilar membrane, and the electromechanical activity of the outer hair cells.

The mechanical contribution is preferably calculated by applying the fundamental physical principles of conservation of mass and motion of deformable bodies. A detailed derivation of the governing equations of the mechanical contribution is provided in the Examples section that follows.

The electrical contribution is based, as stated, on the properties of the outer hair cells. The outer hair cells are apithelial cells, located in two different electochemical environments. The apical part faces the endolymph of the scala media, and the basolateral part faces the supporting cells and the perilymph of the scala tympani. Due to the motion of the basilar membrane, the stereocilia of the outer hair cell is bent, its tip links are stretched and physically open ion channels causing a flow of potassium and calcium ions from the endolymph into the cell. As a result, an electrical voltage drop is introduced on the basolateral of the cell's membrane [Dallos, 1997 supra].

Those electrical changes induce an electrical force which, in tern, introduces elongation-contraction changes to the outer hair cells. The process proceeds cycle by cycle and provides a mechanical feedback to the basilar membrane motion. This process underlines the high sensitivity and frequency selectivity of the mammalian cochlea.

According to a preferred embodiment of the present invention, the total pressure on the vibrating membrane, $P_{BM}$, is calculated as the sum of the aforementioned mechanical and electrical contributions. Specifically, $$P_{BM} = P + P_{OHC}. \qquad (EQ. 2)$$

A preferred expression for $P_{BM}$ reads:

$$P_{BM} = m_{BM}(x) \cdot \frac{\partial^2 \xi_{BM}}{\partial t^2} + r_{BM}(x, t) \cdot \frac{\partial \xi_{BM}}{\partial t} + s_{BM}(x, t) \cdot \xi_{BM}, \qquad (EQ. 3)$$

where $\xi_{BM}$, $m_{BM}$, $r_{BM}$, and $s_{BM}$ are, respectively, the displacement, mass, resistance, and stiffness per unit length of the membrane.

A preferred expression for the electrical contribution, $P_{OHC}$, reads:

$$P_{OHC} = \gamma F_{OHC}, \quad (EQ. 4)$$

where $F_{OHC}$ is the force induced by the outer hair cell due to its elongation, and $\gamma$ is a density parameter, which can be interpreted, for example, as the relative density per unit length of the outer hair cell along the cochlear duct. For further details of the derivation of Equations 3 and 4 see Example 1, below.

FIG. 3a shows the effect of the electrical contribution on the excitation patterns of the vibrating membrane, according to the presently preferred embodiment of the invention. For comparison, FIG. 3b shows the excitation patterns in case of no electrical contribution ($P = P_{BM}$). As shown in FIGS. 3a-b, the presence of the electrical contribution (or, from physiological point of view, the precedence of the outer hair cells) is almost solely responsible for the vibration resonances along the vibrating membrane. When such contribution is absent, the resonances are significantly suppressed.

As can be understood from inspecting Equation 4, the electrical contribution depends, inter alia, on the value of the density parameter, $\gamma$. It has been uncovered by the inventor of the present invention that the value of $\gamma$ can be used to quantitatively characterize the hearing ability of a subject. For example, a hearing-impaired subject can be characterized by $\gamma = 0$. Thus, according to a preferred embodiment of the present invention the value or spatial dependence of $\gamma$ is selected so as to mimic the hearing ability of a normal subject. Practically, $\gamma$ is preferably selected such that the reconstructed signal has a threshold band which resembles a threshold band of a normal hearing subject. For example, such threshold band can vary from about −10 dB to about 10 dB.

There is more than one way to select the value of $\gamma$. For example, in one embodiment, $\gamma$ is uniform. In this embodiment, $\gamma$ can be set, without limitation, to a value of from about 0.4 to about 0.6. These values have been found to be consistent with normal cochlear. In another embodiment, $\gamma$ is a function of x. A representative example of a functional dependence of $\gamma$ includes, without limitation, an exponential saturation function. In an additional embodiment $\gamma$ has a random distribution along the vibrating membrane. A representative example of such random distribution includes, without limitation, a Gaussian distribution.

One ordinarily skilled in the art would appreciate that there is more than one numerical method to obtain a solution to the anatomical model, such as the model delineated in Equations 2-4. In one embodiment, $P_{BM}$ and $P_{OHC}$ are calculated in the frequency domain representation, using any known mathematical procedure, such as, but not limited to, a finite difference method or a finite-element method.

In another embodiment, $P_{BM}$ and $P_{OHC}$ are calculated in the time domain representation, e.g., using a plurality of time steps, where for each time step, the spatial dependence of $P_{BM}$ and $P_{OHC}$ is calculated separately. Once the spatial dependence is calculated for all the time steps, the time dependence can be calculated, for example, using Euler method, modified Euler method, Runge-Kutta method, Runge-Kutta-Fehlberg method, Jacobi method, Heun method and the like. Descriptions of the aforementioned mathematical procedures can be found any many text books [to this end see, e.g., Burden, R. L and Faires, J. D., "Numerical Analysis," Brooks/Cole, 1997; and see, e.g., Iserles, A., "A first course in the numerical analysis of differential equations," 1997, Cambridge University].

According to another aspect of the present invention there is provided a software apparatus 40 for identifying patterns in a digitized acoustic signal. Apparatus 40 can be used to effect the method according to a preferred embodiment of the present invention.

Figure 4:
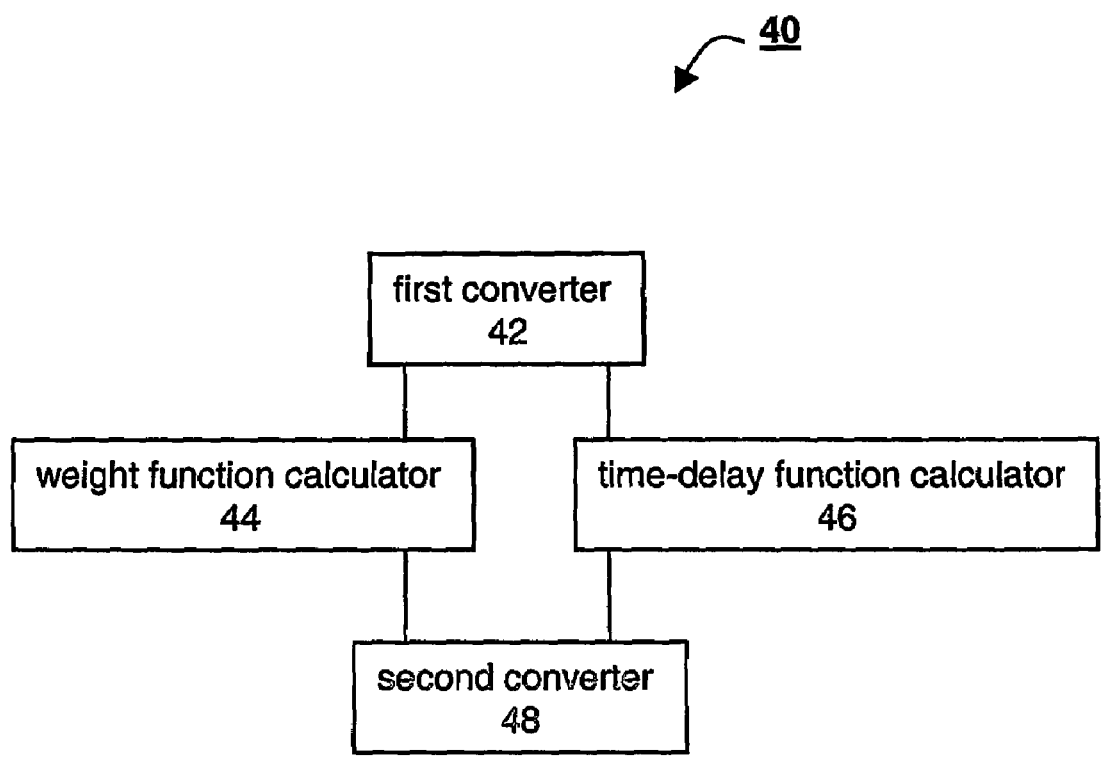
FIG. 4 is a schematic illustration of a software apparatus for identifying patterns in an acoustic signal, according to a preferred embodiment of the present invention.

Reference is now made to FIG. 4, which is a schematic illustration of apparatus 40. Apparatus 40 comprises a first converter 42, for converting the digitized acoustic signal into a spatial representation, as further detailed hereinabove. Apparatus 40 further comprises a weight function calculator 44. Calculator 44 serves for calculating the weight function, $\hat{\alpha}(x)$. Apparatus 40 further comprises a time-delay function calculator 46, for calculating the time-delay function, $\hat{t}(x)$, as further detailed hereinabove. According to a preferred embodiment of the present invention apparatus 40 further comprises a second converter 48 for converting the spatial representation into the reconstructed acoustic signal, as further detailed hereinabove.

According to an additional aspect of the present invention there is provided a system 50 for identifying patterns in an acoustic signal. System 50 can be, or serve as a component in, many applications including, without limitation, a hearing aid system a vocoder and a speech recognizing system.

Figure 5:
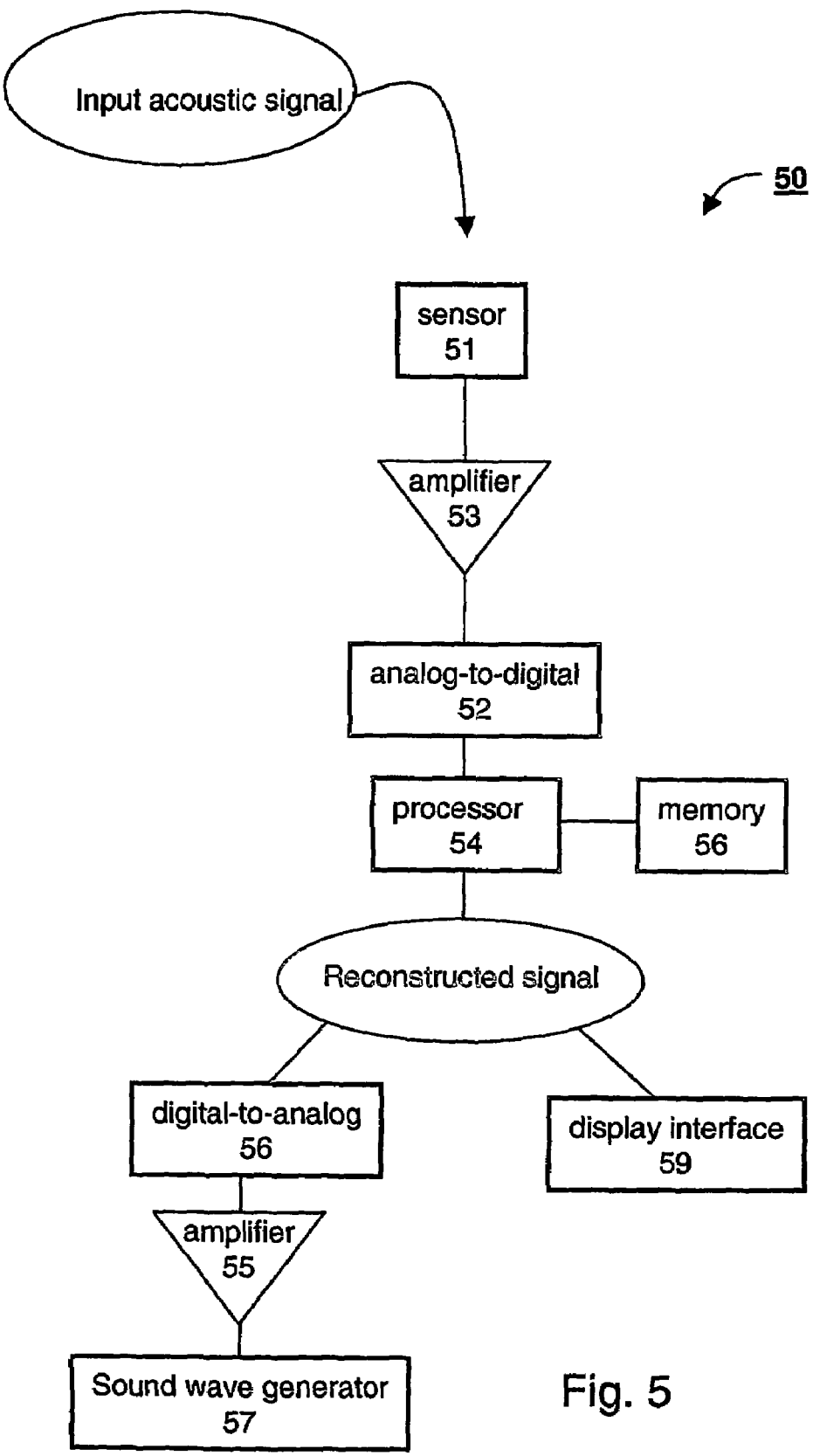
FIG. 5 is a schematic illustration of a system for identifying patterns in an acoustic signal, according to a preferred embodiment of the present invention.

Reference is now made to FIG. 5, which is a schematic illustration of system 50. System 50 comprises an analog-to-digital unit 52. Unit 52 serves for digitizing the acoustic signal so as to provide the digitized acoustic signal. Optionally and preferably, unit 52 can be connected to an acoustic sensor 51 (e.g., a microphone) which converts the physical sound wave to an analog electrical signal. In addition, an amplifier 53 can be employed to amplify the analog signal generated by sensor 51. System 50 further comprises a processor 54. Processor 54 preferably communicates with a memory unit 56 which stores suitable software apparatus (e.g., apparatus 40) designed for converting the digitized acoustic signal into a spatial representation, calculating the weight and optionally the time-delay function, and converting the spatial representation into a reconstructed digitized acoustic signal.

According to a preferred embodiment of the present invention processor 54 is capable of executing the instructions of the software apparatus substantially in real time. More specifically, processor 54 is preferably capable of executing the instructions of the software apparatus while minimizing need for communication among its internal units, and without affecting digital signal processing in its peripheral area.

Many types of processors are contemplated, including, without limitation, general purpose processors and domain specific processors, e.g., Digital Signal Processors (DSPs). Processor 54 can also be implemented as a distributed network of multiprocessor nodes or a Field Programmable Gate Array (FPGA).

System 50 further comprises a digital-to-analog unit 58 for converting the reconstructed signal into an analog acoustic signal. Optionally and preferably, unit 58 can be connected, preferably through a second amplifier 55, to a sound wave generator 57 (e.g., a speaker) which uses the output of unit 58 to generate a sound wave. Alternatively, system 50 may comprise a display interface 59 for transmitting the acoustic patterns to a display device (not shown). In this embodiment, display interface 59 can receive information directly, e.g., through a suitable bus, from processor 54, without the use of digital-to-analog unit 58.

It is expected that during the life of this patent many relevant spatial representations of acoustic signals will be developed and the scope of the term spatial representation is intended to include all such new technologies a priori.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions illustrate the invention in a non limiting fashion.

Example 1

Derivation of the Anatomical Model

In the present example, an outer hair cell model is combined with a complete time-domain one-dimensional cochlear model. The two models control each other through the motion of the basilar membrane.

Mechanical Contribution

In a simple one-dimensional model of the cochlea the cochlea is considered as an uncoiled two fluid-filled rigid-walled compartments separated by a basilar membrane [see, e.g., Zwislocki J. J., "Theory of the acoustical action of the cochlea," 1950, J. Acoust. Soc. Am. 22, 778-784; Zweig, G., Lipes, R. and Pirce J. R, "The cochlear compromise," 1976, J. Acoust. Soc. Am, 59, 975-982; Viergever, M. A. "Mechanics of the inner ear a mathematical approach," 1980, Delft University of technology, Netherlands; and Furst, M., Goldstein, J. L, "A cochlear transmission line model compatible with psychophysics," . 1982, J. Acoust. Soc. Am., 72:717-726].

The basic equations governing the motion of the basilar membrane are obtained by applying fundamental physical principles as conservation of mass and motion of deformable bodies.

Defining the pressure in scala tympani and scala vestibuli of the cochlea by $P_T$ and $P_V$, respectively, the pressure difference across the basilar membrane is given by:

$$P = P_T - P_V \quad (EQ. 5)$$

Both the scala tympani and scala vestibuli contain perilymph. Assuming incompressible and inviscid fluid properties to the perilymph, the equation of motion for each scala can be written as:

$$\rho \frac{\partial U_T}{\partial t} = -\frac{\partial P_T}{\partial x} \quad (EQ. 6)$$
$$\rho \frac{\partial U_V}{\partial t} = -\frac{\partial P_V}{\partial x},$$

where, $U_T$ is the fluid velocity in the scala tympani, $U_V$ is the fluid velocity in the scala vestibuli and $\rho$ is the perilymph density.

Assuming that the basilar membrane has point-wise mechanical properties, the velocity of each point of the basilar membrane can be determined by the pressure difference across that point. The relation between the fluid velocities, $U_V$ and $U_T$, and the basilar membrane displacement, $\xi_{BM}$, is given by the conservation of mass principle:

$$A \frac{\partial U_V}{\partial x} = \beta \frac{\partial \xi_{BM}}{\partial t} \quad (EQ. 7)$$
$$A \frac{\partial U_T}{\partial x} = -\beta \frac{\partial \xi_{BM}}{\partial t},$$

where, A is the cross sectional area of scala tympani and scala vestibuli, and $\beta$ is the correspondent basilar membrane length. Combing Equations 5, 6 and 7 yields the following differential equation for P:

$$\frac{\partial^2 P}{\partial x^2} = \frac{2\rho\beta}{A} \frac{\partial^2 \xi_{BM}}{\partial t^2}, \quad (EQ. 8)$$

with the boundary conditions:

$$\left. \begin{array}{l} U_V(0, t) = -U_T(0, t) = f(t) \\ P(L, t) = 0 \end{array} \right\}, \quad (EQ. 9)$$

where f(t) is the auditory stimulus, and L is the cochlear length.

Hence, the mechanical contribution to the anatomical model is given by Equation 3 above, which is conveniently rewritten as Equation 10, below:

$$P_{BM} = m_{BM}(x) \cdot \frac{\partial^2 \xi_{BM}}{\partial t^2} + r_{BM}(x, t) \cdot \frac{\partial \xi_{BM}}{\partial t} + s_{BM}(x, t) \cdot \xi_{BM}, \quad (EQ. 10)$$

where, $m_{BM}$, $r_{BM}$, and $s_{BM}$ are, respectively, the mass, resistance, and stiffness per unit length of the basilar membrane.

The model for the outer hair cell and the correspondent equations for $P_{OHC}$ derivation are presented in the next section.

Outer Hair Cell Contribution

As stated, electrical changes introduce shape changes in the form repeated elongation-contraction of the outer hair cells. The somatic elongation-contraction process operates on cycle-by-cycle basis at the frequency stimulus and provides a mechanical feedback to the basilar membrane motion. This process underlines the high sensitivity and frequency selectivity of the mammalian cochlea. However, the outer hair cell membrane acts as a low-pass filter with a cutoff frequency of about 1 kHz. Dallos and Evans (1995) proposed that electro-motility at high frequencies is provided by extracellular potential gradient across the hair cell.

Following is a description of an electrical model of the outer hair cells of for the cochlea which is not intended to be limiting.

Figure 6:
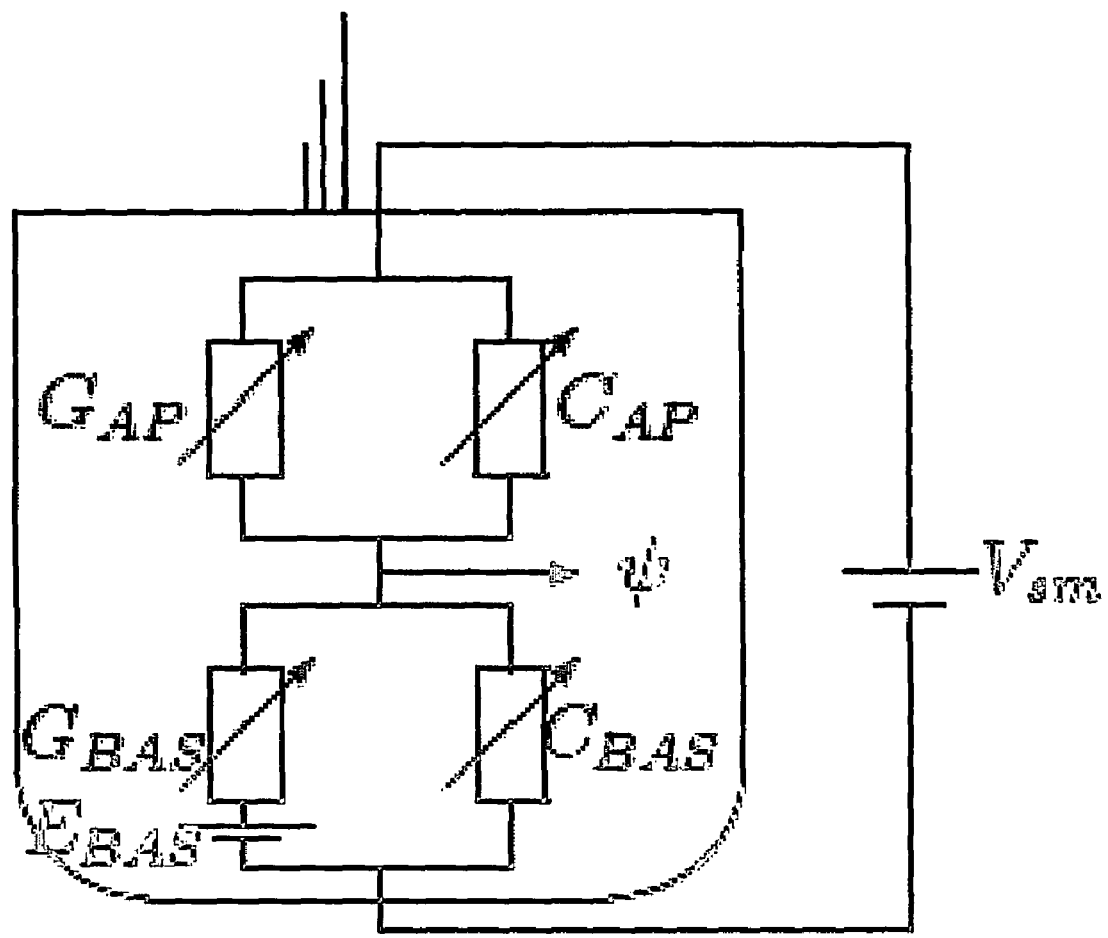
FIG. 6 is a simplified illustration of an equivalent electrical circuit modeling the electrical activity in a single outer hair cell, according to a preferred embodiment of the present invention.

Reference is now made to FIG. 6, which is a simplified illustration of an equivalent electrical circuit modeling the electrical activity in a single outer hair cell. The cell membrane is divided into two parts, the apical part and the basolateral part. Each of the two parts is presented in the equivalent electrical circuit by its conductance ($G_{AP}$ and $G_{BAS}$), and capacitance ($C_{AP}$ and $C_{BAS}$), where the subscripts "AP" and "BAS" stand for apical part and the basolateral part of the cell's membrane, respectively.

According to a preferred embodiment of the present invention the electrical potential across the cell membrane equals the potential of the scala media, $V_{SM}$. The potential difference across the basolateral part is presented by $\psi$ in FIG. 6. The stereocilia motion causes a current flow through the apical part of the outer hair cell which yields apical current, $I_{AP}$, given by $$I_{AP} = (V_{SM} - \psi) \cdot G_{AP} + \frac{d}{dt}[C_{AP} \cdot (V_{SM} - \psi)]. \quad \text{(EQ. 11)}$$

The basolateral current, $I_{BAS}$, is given by:

$$I_{BAS} = G_{BAS} \cdot (\psi - E_{BAS}) + \frac{d}{dt}[C_{BAS} \cdot \psi]. \quad \text{(EQ. 12)}$$

According to Kirchhoff's current law, the current flowing through the apical segment equals the current flowing through the basolateral segment. Setting $I_{AP} = I_{BAS}$ in Equations 11-12, one obtains the following differential equation for the potential difference, $\psi$:

$$(C_{BAS} + C_{AP}) \cdot \frac{d\psi}{dt} + \left(G_{AP} + G_{BAS} + \frac{dC_{BAS}}{dt} + \frac{dC_{AP}}{dt}\right) \cdot \psi = \quad \text{(EQ. 13)}$$
$$V_{SM} \cdot \left(G_{AP} + \frac{dC_{AP}}{dt}\right) + C_{AP} \frac{dV_{SM}}{dt} + G_{BAS} \cdot E_{BAS}.$$

Although, in principle, a numerical solution to Equation 13 can be obtained, it was found by the inventor of the present invention that sufficiently accurate results can be obtained, by considering the following assumptions:

First, it is recognized that the capacitance and the conductance of the membrane of the outer hair cell are proportional to the membrane surface area and that basolateral membrane area is larger than the apical part. Consequently, the ratio between the basolateral and apical capacitance is more than sixteen, and the ratio of the conductance is more than seven [Housley G. D and Ashmore J. F, "Ionic currents of outer hair cells isolated from the guinea-pig cochlea," 1992, J. Physiol. 448, 73-98]. Thus, the first assumption reads $$C_{AP} \ll C_{BAS} \text{ and } G_{AP} \ll G_{BAS}. \quad \text{(EQ. 14)}$$

Second, the basolateral capacitance and conductance are relatively small [Lukashkin, A. N. and Russell, I. J, "The voltage dependence for the tranducer may modify outer hair cell motility," 1997, Brit J Audiol 31, 85-86]. Thus, the second assumption reads $$\frac{dC_{BAS}}{dt} \approx 0. \quad \text{(EQ. 15)}$$

Third, $|dC_{AP}/dt|$ is at most in the order-of-magnitude of $|G_{AP}|$. Thus from the first assumption one can conclude that:

$$\left|\frac{dC_{AP}}{dt}\right| \ll |G_{BAS}| \quad \text{(EQ. 16)}$$

Forth, the outer hair cell membrane acts as a low pass filter with a cutoff frequency of about 1 kHz [Dallos and Evans, 1995, supra]. In the fourth assumption one attributes a constant frequency, $\omega_{OHC}$ to the outer hair cell. The frequency, $\omega_{OHC}$ can be defined as:

$$\omega_{OHC} = \frac{G_{AP} + G_{BAS}}{C_{AP} + C_{BAS}} \approx \frac{G_{BAS}}{C_{BAS}} = Const. = 1 \text{kHz}. \quad \text{(EQ. 17)}$$

In a fifth assumption, the electrical potential across the scala media, $V_{SM}$, is approximately constant [Mountain, D. C. and Hubbard, A. E., "Computational analysis of hair cell and auditory nerve processes," Auditory computation, Hawkins, H. L. McMullen, T. A., Popper, A. N. and Fay, R. R, editors, Springer, 1995, pp. 121-156]:

$$\frac{dV_{SM}}{dt} \approx 0. \quad \text{(EQ. 18)}$$

Substituting Equations 14-17 in Equation 13 one obtains a simplified differential equation for the potential difference, $\psi$:

$$\frac{d\psi}{dt} + \omega_{OHC} \cdot [\psi - E_{BAS}] = \lambda \cdot \left[G_{AP} + \frac{dC_{AP}}{dt}\right], \quad \text{(EQ. 19)}$$

where:

$$\lambda = V_{SM} / [C_{BAS} + C_{AP}] \approx V_{SM} / C_{BAS} = Const. \quad \text{(EQ. 20)}$$

The apical membrane capacitance and conductance undergo changes due to active opening of ion channels in the apical part of the outer hair cell. The outer hair cells' stereocilia are shallowly but firmly embedded in the undersurface of the tectorial membrane. Since the tectorial membrane is attached on one side to the basilar membrane, a shear motion arises between the tectorial membrane and the organ of Corti, when the basilar membrane moves up and down [Pickles, J. O., "An introduction to the physiology of hearing,", 1988, Academic Press, $2^{nd}$ edition]. The arch of Corti maintains the rigidity of the organ during the movement. The tectorial membrane is also a rigid structure.

It is therefore assumed that the outer hair cell bundle displacement is a function of the basilar membrane vertical displacement [Nobili, R., Mammano, F. and Ashmore, J. F, "How well do we understand the cochlea?", 1998, TINS, 21, 159-165]. In other words, according to a preferred embodiment of the present invention both $G_{AP}$ and $C_{AP}$ are function of $\xi_{BM}$.

The functional dependence of $G_{AP}$ and $C_{AP}$ can be described, for example, by a second order Boltzmann function [see, e.g., Sachs, F., Lecar, H., "Stochastic models for mechanical transductions," 1991, Biophys J. 59, 1143-1145; Lukashkin and Russel, supra].

A known property of the outer hair cell is that both its length change and its axial stiffness depend on the potential difference, $\psi$ [Jerry R. A., Popel A. S and Brownell W. E., "Outer hair cell length changes in an external electric field. I. The role of intracellular electro-osmotically generated pressure gradients," 1995, J. Acoust. Soc. Am 98, 2000-2017; Dallos, 2000, supra]. The force, $F_{OHC}$, that an outer hair cell exhibits due to voltage change is therefore given by:

$$F_{OHC} = K_{OHC} \cdot [\xi_{BM} + \Delta l_{OHC}], \quad \text{(EQ. 21)}$$

where, $\Delta l_{OHC}$ is length change of the outer hair cell and $K_{OHC}$ is its axial stiffness.

According to a preferred embodiment of the present invention Equation 21 is used for calculating the electrical contribution, given in Equation 4, above.

Example 2

Solution of the Anatomical Model

Frequency Domain Solution

The simplified electrical contribution (Equations 4, 19 and 21 hereinabove) of the anatomical model is particularly effective in low stimuli level, were the second order Boltzmann functions can be approximated by linear functions for the capacitance, conductance, length change and stiffness.

In this example, the following linear approximation is assumed:

$$\left.\begin{array}{l} G_{AP} = \alpha_G^0 + \alpha_G \cdot \xi_{BM} \\ C_{AP} = \alpha_C^0 + \alpha_C \cdot \xi_{BM} \\ \Delta l_{OHC} = \alpha_1^0 - \alpha_1 \cdot \psi \end{array}\right\} \quad \text{(EQ. 22)}$$

where, $\alpha_G$, $\alpha_C$, and $\alpha_l$ are all positive numbers. Substituting the Equations 22 in Equation 19 one finds the following differential equation for $P_{OHC}$:

$$\frac{\partial P_{OHC}}{\partial t} + \omega_{OHC} \cdot P_{OHC} = \gamma \cdot \left[\alpha_1 \cdot \xi_{BM} + \alpha_2 \cdot \frac{\partial \xi_{BM}}{\partial t} + \alpha_0\right], \quad \text{(EQ. 23)}$$

where $\alpha_0$, $\alpha_1$ and $\alpha_2$ are derived from the Equations 19, 4, and 22, which yields that $\alpha_0$=0. The density parameter $\gamma$ is preferably selected in the interval [0, 1]. One of ordinary skill in the art would appreciate upon inspecting Equation 23 that $P_{OHC}$ increases with $\gamma$.

In order to obtain the values of $\alpha_1$ and $\alpha_2$, a steady state sinusoidal input of frequency $\omega$ is assumed. Thus, Equation 23 can be solved in the frequency domain, which yields:

$$P_{OHC}(\omega, x) = \gamma(x) \cdot \frac{\alpha_1(x) + j\omega \cdot \alpha_2(x)}{\omega_{OHC} + j\omega} \xi_{BM}(\omega, x), \quad \text{(EQ. 24)}$$

where $j^2$=−1.

Substituting Equation 24 in the frequency domain representation of Equations 2 and 3 one finds:

$$P(x,\omega) = j \cdot \omega \cdot Z(x,\omega) \cdot \xi_{BM}(x,\omega), \quad \text{(EQ. 25)}$$

where $Z(x,\omega)$ is a complex function, satisfying:

$$\left.\begin{array}{l} \text{Re}\{Z(x, \omega)\} = r(x) - \gamma(x) \frac{\alpha_2(x) \cdot \omega_{OHC} - \alpha_1(x)}{\omega^2 + \omega_{OHC}^2} \\ \text{Im}\{Z(x, \omega)\} = m(x) \cdot \omega - \frac{s(x)}{\omega} + \frac{\gamma(x)}{\omega} \cdot \frac{\alpha_1(x) \cdot \omega_{OHC} + \alpha_2(x) \cdot \omega^2}{\omega^2 + \omega_{OHC}^2} \end{array}\right\}. \quad \text{(EQ. 26)}$$

An additional simplification can be achieved if one imply a harmonic assumption, according to which, for every location along the cochlear partition a resonance is produced at a position x when the stimulus frequency, $\omega$, equals $\omega_{CF}(x) = \sqrt{s(x)/m(x)}$.

The values of the parameters $\alpha_1$ and $\alpha_2$ can be obtained by requiring that for $\gamma$=1, Re Z=Im Z=0, while for $\gamma$=0, Re Z≠Im Z=0. Substituting these requirements in Equation 24 one finds, $$\left.\begin{array}{l} \alpha_1(x) = -\frac{r(x) \cdot s(x)}{m(x)} \\ \alpha_2(x) = r(x) \cdot \omega_{OHC} \end{array}\right\}. \quad \text{(EQ. 27)}$$

When $\gamma$=0, the outer hair cells are not contributing to the basilar membrane motion, hence $P_{OHC}$=0. On the other hand, $\gamma$=1 means that the basilar membrane displacement can reach infinity at the location whose characteristic frequency is equal to the stimulus frequency.

In the linear approximation, Equation 8 for the pressure difference, P, can be written in the frequency domain as:

$$\frac{d^2 P(x, \omega)}{dx^2} + K^2(x, \omega) \cdot P(x, \omega) = 0 \quad \text{(EQ. 28)}$$

where $K^2(x,\omega) = 2j\omega\rho\beta/AZ(x,\omega)$. $Z(x,\omega)$ can be obtained by substituting $\alpha_1$ and $\alpha_2$ of Equation 27 into Equations 26. The frequency domain boundary conditions are obtained by transforming Equation 9 to the frequency domain:

$$\left.\begin{array}{l} \left.\frac{dP(x, \omega)}{dx}\right|_{x=0} = 2j\omega\rho F(\omega) \\ P(L, \omega) = 0 \end{array}\right\}, \quad \text{(EQ. 29)}$$

The most common method used for solving Equations 28 and 29 is the WKB approximation [e.g., Viergever, supra]. In this approximation, one assumes that K(x) varies slowly with x. However, as will be appreciated by a skilled artisan, near the resonance frequency this assumption is not valid, especially when $\gamma$ approaches unity.

In this example, Equations 28 and 29 are solved using a finite difference method. As stated, the model can also be solved by other mathematical procedures.

Hence, defining a uniform grid of N points in the interval [0, L], so that $x_l$=lh and $P_l$=P($x_l$), where h=L/N, and l=0, 1, ..., N−1, a linear combinations of the Taylor expansions for $P_{l+1}$ and $P_{l+1}$ is applied to obtain:

$$\left.\frac{d^2 P}{dx^2}\right|_{x=x_l} = \frac{P_{l-1} - 2P_l + P_{l+1}}{h^2} + o(h^2) \quad 1 < l < N-2 \qquad \text{(EQ. 30)}$$

$$\left.\frac{d^2 P}{dx^2}\right|_{x=0} = \frac{2(P_1 - P_0 - hP'_0)}{h^2} + o(h)$$

where $P'_0 = 2j\omega\rho \cdot F(\omega)$ and $P'_{N-1} = 0$ are derived from the boundary conditions (Equation 29). Note that for $1 < l < N-2$, the derivatives of P are approximated by higher order of h, relative to the borders points ($l=0$, and $l=N-1$). Specifically, at the off-boundary points P varies quadratically with h and at the border P varies linearly with h. The linear approximation at the edge is justified by the assumption that P is a smooth function.

Equations 30 can be expressed as a set of linear equations:

$$\Lambda \cdot \underline{P} = \underline{\Gamma} \qquad \text{(EQ. 31)}$$

where $\underline{P} = [P_0, P_1, \ldots, P_{N-1}]^T$, $\underline{\Gamma} = 2hj\omega\rho \cdot F(\omega) \cdot [1, 0, \ldots, 0]^T$ and $\Lambda$ is a tridiagonal square matrix of the size N×N, whose values on the diagonal ($\Lambda_{ll}$) are given by:

$$\Lambda_{ll} = \begin{cases} -1 + h^2 \cdot K^2(x_0)/2, & l = 0 \\ -2 + h^2 \cdot K^2(x_l), & 1 \le l \le N-2 \\ 1, & l = N-1 \end{cases} \qquad \text{(EQ. 32)}$$

and the values on the diagonal plus or minus one column are all equal to 1. More specifically, $\Lambda_{l,l+1} = 1$ for $l = 0, \ldots, N-2$, and $\Lambda_{l,l-1} = 1$ for $l = 1, \ldots, N-2$, and $\Lambda_{N-1,N-2} = 0$.

Time Domain Solution

The time domain solution is preferably performed in two steps [Furst and Goldstein, 1982, supra]. In a first step, the boundary condition differential equation is solved by holding the time as a fixed parameter, so as to obtain a set of initial condition equations, and in a second step, these equations are solved to obtain the time dependence of the solution, For a fixed time, t, Equations 2 and 3 are substituted into Equation 8:

$$\frac{\partial^2 P}{\partial x^2} - \Omega(x) \cdot P = g(x, t) \cdot \Omega(x) \qquad \text{(EQ. 33)}$$

where $\Omega(x) \equiv 2\rho\beta/mA$, and $$g(x, t) = -\left[r \frac{\partial \xi_{BM}}{\partial t} + s\xi_{BM}\right] + P_{OHC}. \qquad \text{(EQ. 34)}$$

One of ordinary skill in the art would appreciate the resemblance between Equation 33 and Equation 28. Equation 33 can therefore be solved using a similar method, for example, the finite difference method.

Following the derivation of Equations 29-32 above, Equation 33 is first expressed as a set of linear equations:

$$\Delta \cdot \underline{P} = \underline{Y} \qquad \text{(EQ. 35)}$$

where $\underline{P} = [P_0, P_1, \ldots, P_{N-1}]^T$ is the same as above (see the discussion following Equation 31), but it is obtained for every time step t.

Equations 9 are then expressed as $P'_0 = 2\rho f'(t)$ and $P_{N-1} = 0$ thus $$\underline{Y} = \begin{bmatrix} 2h\rho f'(t) + \frac{1}{2}h^2 g(x_0, t) \cdot \Omega(x_0) \\ h^2 g(x_1, t) \cdot \Omega(x_1) \\ \vdots \\ h^2 g(x_{N-2}, t) \cdot \Omega(x_{N-2}) \\ 0 \end{bmatrix}. \qquad \text{(Eq. 36)}$$

Similarly to $\Lambda$, $\Delta$ is a tridiagonal square matrix of the size N×N, whose values on the diagonal ($\Delta_{ll}$) are obtained by:

$$\Delta_{ll} = \begin{cases} -[1 + h^2 \Omega(x_0)/2] & l = 0 \\ -[2 + h^2 \Omega(x_l)] & 1 \le l \le N-2 \\ 1, & l = N-1 \end{cases} \qquad \text{(EQ. 37)}$$

and whose bordering values are: $\Delta_{l,l+1} = 1$ for $l = 0, \ldots, N-2$, and $\Delta_{l,l-1} = 1$ for $l = 1, \ldots, N-2$, and $\Delta_{N-1,N-2} = 0$. Note that the matrix $\Delta$ is independent of t, thus there is no need to calculate $\Delta$ in every time step.

At t=0, Equation 35 can be solved using the initial conditions:

$$\xi_{BM}(x, t = 0) = 0 \qquad \text{(EQ. 37)}$$

$$\left.\frac{\partial \xi_{BM}(x, t)}{\partial t}\right|_{t=0} = 0$$

$$P_{OHC}(x, t = 0) = 0$$

and then using Equation 34 for calculating $g(x, t=0)$.

For the next time step $t = t + \Delta t$, $\xi_{BM}$, $\partial \xi_{BM}/\partial t$, and $P_{OHC}$ can derived using the modified Euler method [see, e.g., Iserles, A., "A first course in the numerical analysis of differential equations," 1997, Cambridge University] for solving Equations 2 and 4.

For each time step the obtained solution can be used for determining the aforementioned energy content, $E(x,t)$, of each region, for example, for the purpose of calculating the weight function, $\hat{\alpha}(x)$. According to a preferred embodiment of the present invention, the energy content of the ith region, defined between $x_i - \Delta x_i$ and $x_i$, at the jth time interval, defined between $t_j - \Delta t_j$ and $t_j$, is:

$$E(x_i, t_j) = \frac{1}{\Delta t_i} \int_{x_i - \Delta x_j}^{x_i} \int_{t_j - \Delta t_j}^{t_j} \left[\frac{\partial \xi_{BM}}{\partial t}\right]^2 dt \cdot dx. \qquad \text{(EQ. 38)}$$

It will be appreciated by a skilled artisan that Equation 38 can be calculated dynamically. Thus, when energy of Equation 38 is used for calculating the weight function, $\hat{\alpha}(x)$, the value of $\hat{\alpha}(x)$ can be updated, substantially in real time. As stated, the value of $\hat{\alpha}(x)$ can be calculated in more than one way. In one such calculation, a predetermined threshold is employed, such that when $E(x,t)$ is below the predetermined threshold $\hat{\alpha}(x)$ is small (e.g., zero) and above the predetermined threshold $\hat{\alpha}(x)$ is large (e.g., 1) and equal to the initial weight function.

Simulations Results

Figure 7:
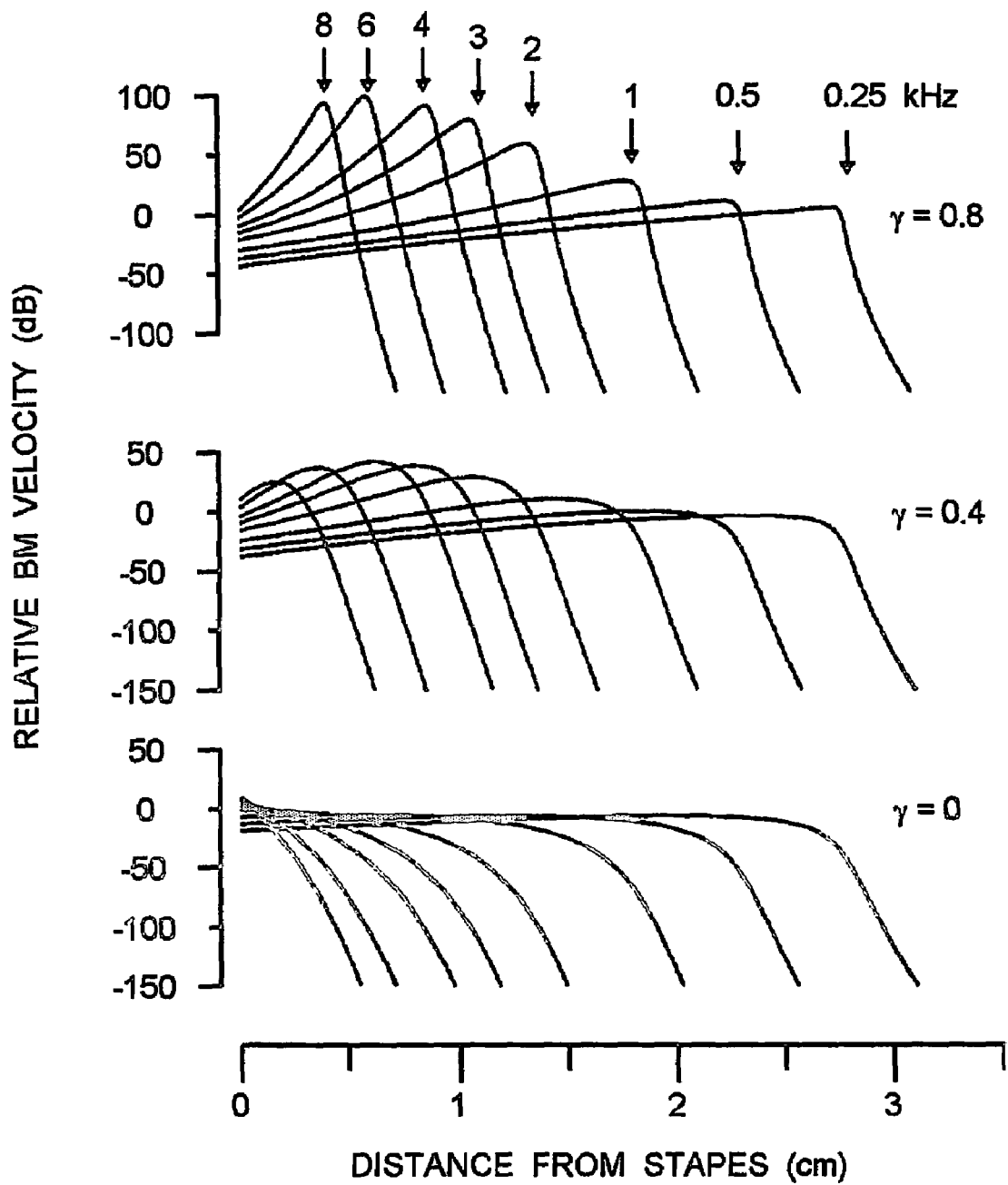
FIG. 7 shows excitation patterns obtained by various steady state sinusoidal inputs, according to a preferred embodiment of the present invention.

FIG. 7 shows the excitation patterns obtained by various steady state sinusoidal inputs. Both, time and frequency solutions yielded similar results for those steady state conditions. Each set of excitation patterns was derived with a different value of γ. In these calculations a fix γ was considered along the whole cochlear partition. As shown in FIG. 7, when γ increases, the location of the resonance for each input frequency moves towards the helicotreama, and the peak at the resonance becomes more significant, especially for frequencies above 1 kHz.

The loudness, $L_d$, of an acoustical signal can be defined as the energy acquired by the whole cochlea due to the basilar membrane velocity [Furst, M., Reshef (Haran), I. Attias, J., "Manifestation of intense noise stimulation on spontaneous otoacoustic emission and threshold microstructure: Experiment and Model," 1992, J. Acoust. Soc. Am., 91:1003-1014]:

$$L_d = \frac{1}{T}\int_0^L \int_0^T \left[\frac{\partial \xi_{BM}}{\partial t}\right]^2 dt \cdot dx. \tag{EQ. 39}$$

Human cochlear activity is best described by its audiogram, which is the threshold obtained in different stimulus frequencies relative to an ideal cochlea. Thus, the model simulation can be used in order to estimate the audiograms that will be obtained with different values of γ.

The threshold, $\Theta(\omega,\gamma)$, obtained by the model for an input frequency ω and a density parameter, γ, is given by:

$$\Theta(\omega,\gamma) = L_d(\omega,0.5) - L_d(\omega,\gamma). \tag{EQ. 40}$$

As can be understood from Equation 40, $\Theta(\omega,0.5)=0$, for all values of the input frequency, ω.

Figure 8:
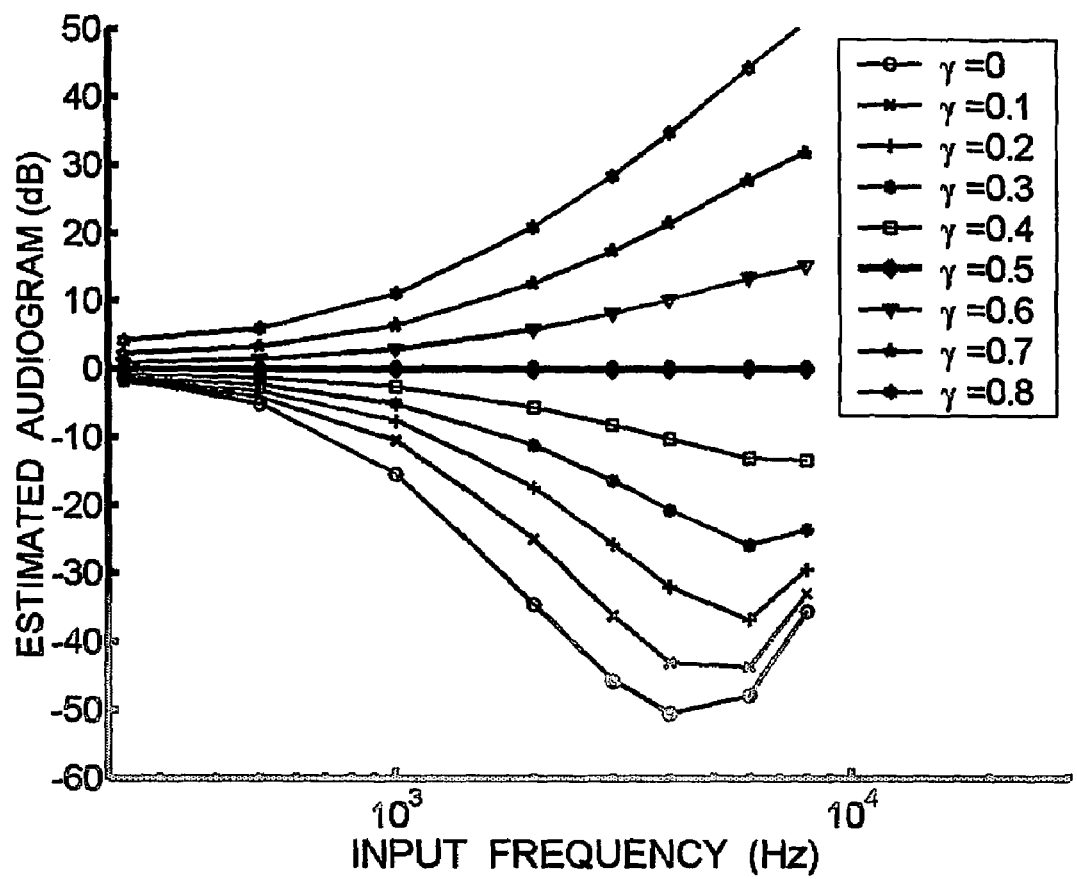
FIG. 8 shows estimated audiograms for different values of the density parameter in embodiment in which the density parameter is uniform.

FIG. 8 shows the estimated audiograms for different values of γ. The estimated audiograms obtained for cochleae with γ>0.5 reveal thresholds that are better then the ideal cochlea. The difference in the estimated thresholds obtained by the different values of γ is less than 20 dB for input frequencies below 1 kHz. However, there is a significant difference in the estimated threshold for higher frequencies. For γ<0.2, each of the estimated audiograms has a maximum threshold at a frequency between 4 and 6 kHz. Those types of audiograms resemble typical phonal trauma audiograms. Higher values of γ (γ>0.5), however, reveal audiograms with decreased threshold as a function of frequency. Those types of audiograms are not realistic, as they are not found among human audiograms.

A normal cochlea can thus be characterized quantitatively by γ=0.5, and a cochlea with outer hair cell loss can be characterized γ which is below 0.5.

Most studies that measured outer hair cell loss on human or animals (e.g. Liberman, M. C. and Dodds, L. W., "Acute ultrastructural changes in acoustic trauma: serial section reconstruction of sterocilia and cuticular plates," 1987, Hearing Research 26, 45-64; Saunders, J. C., Dear, S. P., Schneider, M. E., "The anatomical consequences of acoustic injury: A review and tutorial," 1985, J. Acoust. Soc. Am. 78, 833-860] demonstrated that the outer hair cells loss typically starts at the basal part of the cochlear partition and are gradually expanding toward the helicotreama.

In order to test the model prediction for such a case, a gradual change in γ(x), was assumed. The functional dependence of γ is given by the following saturation function:

$$\gamma(x) = 0.5 \cdot (1 - e^{-\alpha x}). \tag{EQ. 41}$$

Figure 9A:
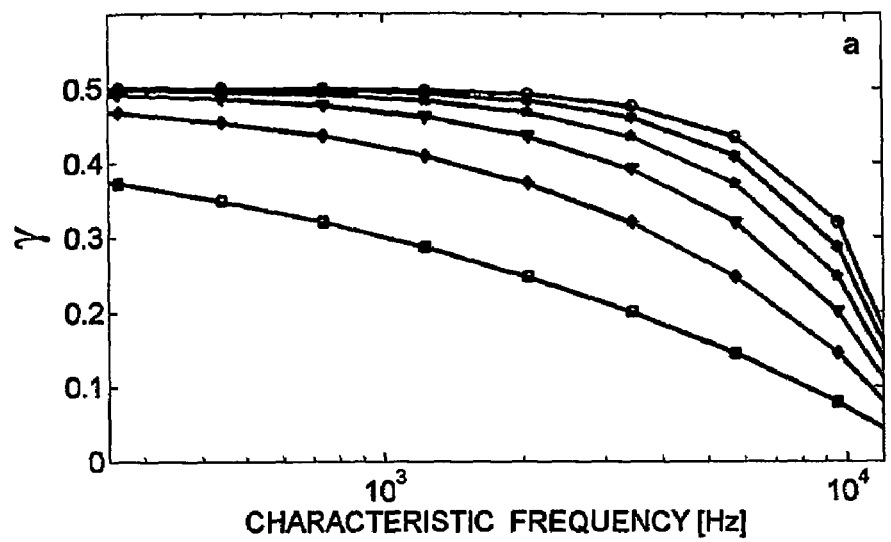
FIG. 9a shows the density parameter in embodiment in which a spatial dependence thereof is a saturation function.
Figure 9B:
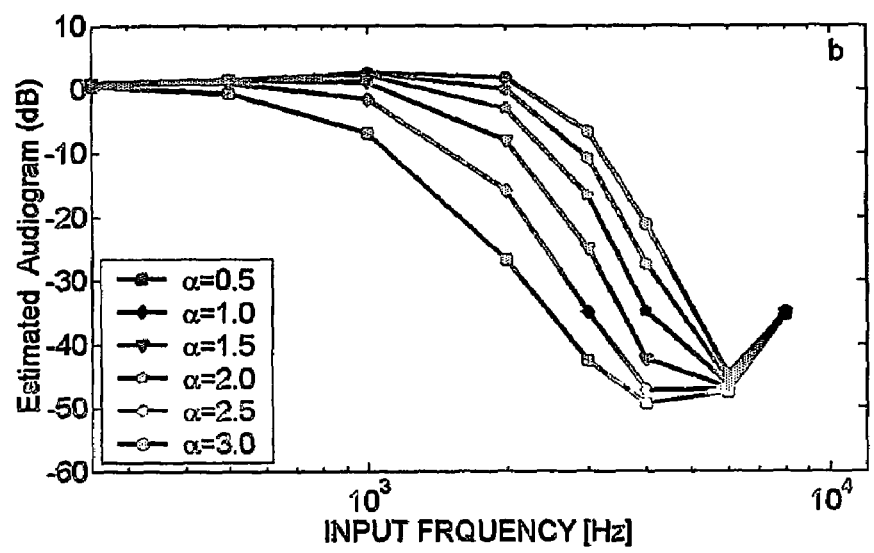

FIG. 9a show Equation 41 for different values of the parameter α, and FIG. 9b show the corresponding audiograms. The estimated audiograms resemble typical hearing-impaired human audiograms, especially obtained by elderly people. There is almost no hearing loss at low frequencies below 1 kHz, but gradual decrease in hearing for higher frequencies.

It is reasonable to assume that the density of the outer hair cells is not fix along the cochlea, but it is randomly varies along the cochlea. For example, γ(x) can be a Gaussian random variable with a mean of 0.5 and standard deviation σ.

Figure 10:
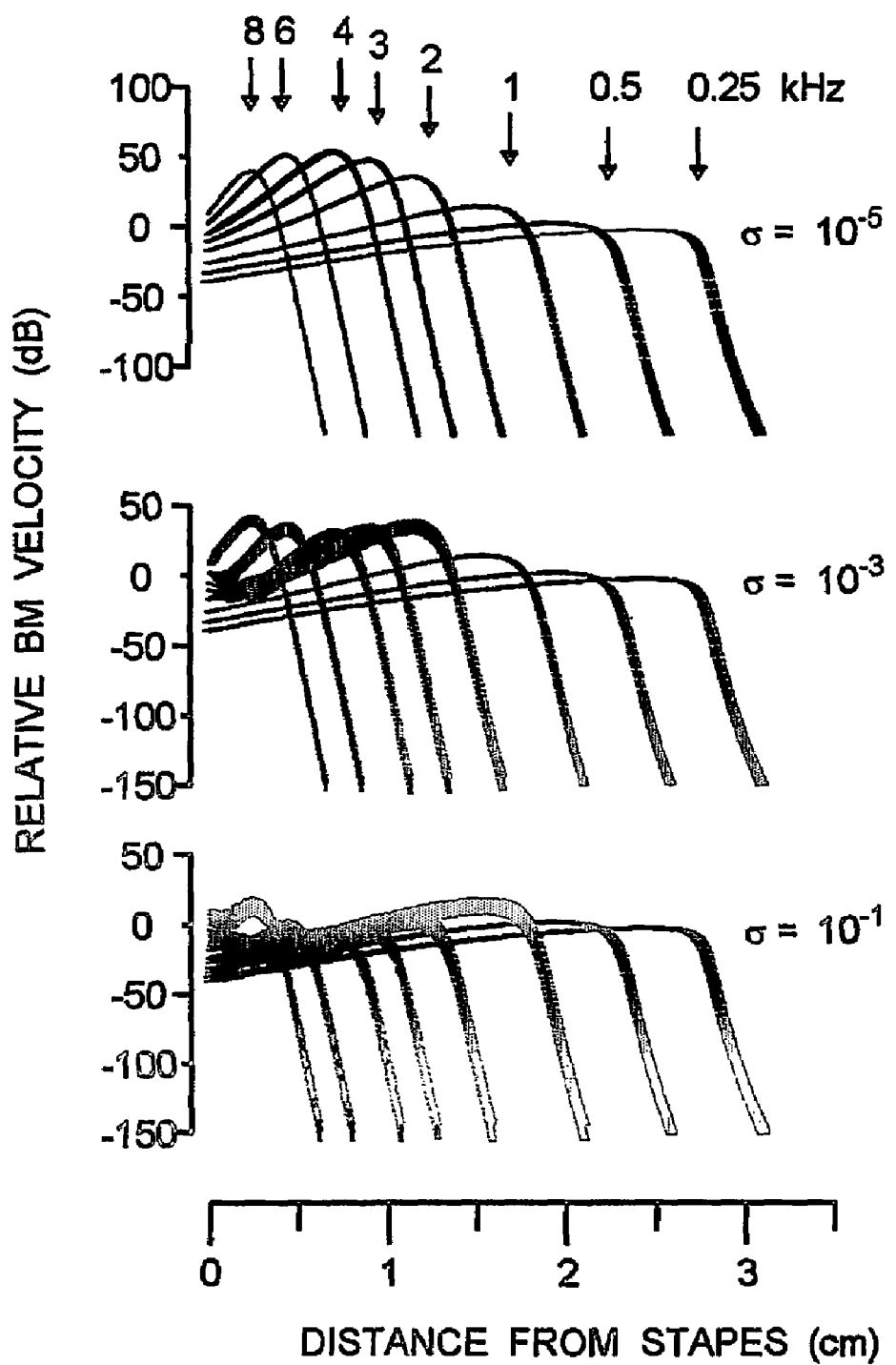
FIG. 10 shows excitation patterns in an embodiment in which a spatial dependence of the density parameter is a Gaussian.
Figure 11:
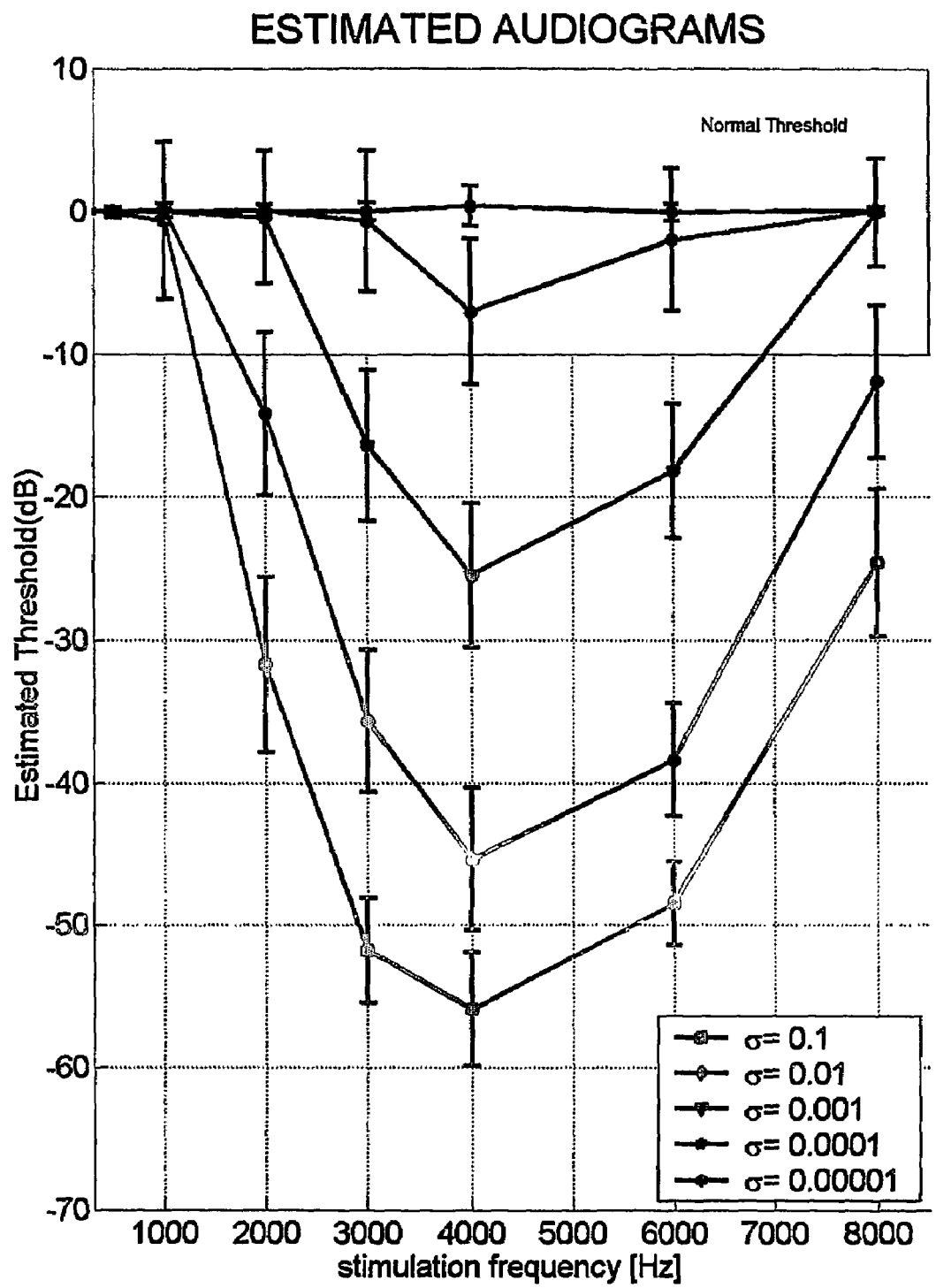
FIG. 11 shows audiograms corresponding to the varying density parameter of FIG. 10.

FIG. 10 shows, excitation patterns obtained for a Gaussian distribution for different values of σ, and the correspondent audiograms together with the means and standard deviations, are shown in FIG. 11.

Each excitation pattern shown in FIG. 10 was obtained from 50 runs of the model, where for each run a different γ(x) was generated. As shown in FIG. 10, that low values of σ correspond to excitation patterns which are similar to those obtained by a fix γ. On the other hand, for larger values of σ, the excitation patterns loose their significant peaks and they resemble excitation patterns corresponding to γ=0.

As shown in FIG. 11, a maximum threshold was observed at 4 kHz when σ>0.01. A maximum threshold of 60 dB was obtained for σ=0.1. The estimated audiograms resemble typical noise-induced hearing loss audiograms.

Reconstruction of the Acoustic Signal

As stated, the output of the anatomical model can be used for reconstructing the input signal. Since the model of a normal cochlea is capable to detect signals even in a very noisy background, a reconstructed signal from the model output shows a significant improvement in signal-to-noise ratio.

The reconstructed signal $\hat{S}(t)$, defined in Equation 1, above, depends on the weight function, $\hat{\alpha}(x)$, the time-delay function $\hat{t}_d(x)$ and the velocity, v. The velocity of the basilar membrane, v, is preferably defined as:

$$v = \partial \xi_{BM}/\partial t. \tag{EQ. 42}$$

To estimate the weight two parameters sets $\hat{\alpha}(x)$ and $\hat{t}_d(x)$ a database of model outputs for sine waves with different frequencies from 100 Hz to 10 kHz, has been constructed. The frequencies resolution was chosen so as to evenly cover the cochlear length. The time-delay estimation was derived by the maximum correlation between the outputs along the cochlea axis. The weight function was determined separately from the database.

Figure 12A:
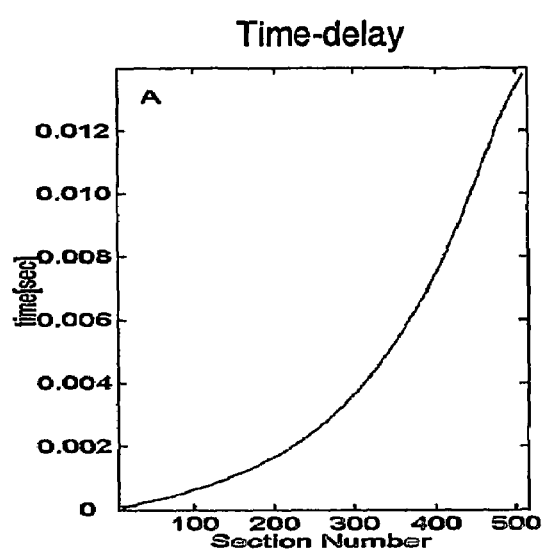
FIGS. 12a-b show a time-delay function (FIG. 12a) and an initial weight function (FIG. 12b), according to a preferred embodiment of the present invention.
Figure 12B:
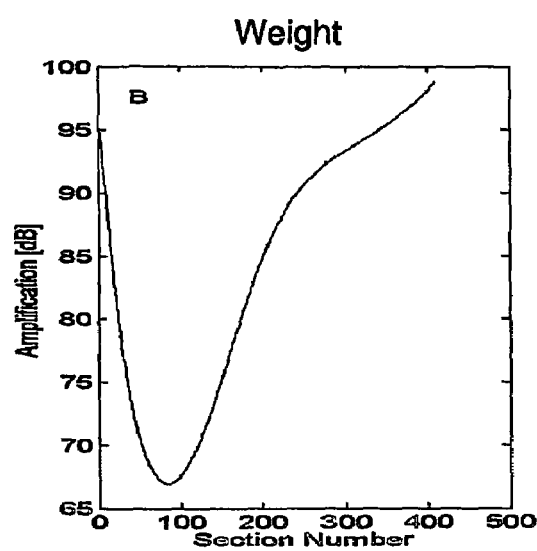

FIG. 12a-b show typical examples of the time-delay function (FIG. 12a) and the weight function (FIG. 12b), according to a preferred embodiment of the present invention.

FIGS. 13a-d shows an example of the reconstruction method. The input signal S(t) is the Hebrew word "BEN" shown in the time domain in FIG. 13a. The reconstructed signal $\hat{S}(t)$ is shown in FIG. 12b. As shown in FIGS. 13a-b, S(t) and $\hat{S}(t)$ are very similar. In listening the two signals are indistinguishable. FIG. 12c shows the same word with the added white noise with a signal-to-noise ratio of −1.5 dB. The reconstructed signal of the noisy word of FIG. 13c is shown in FIG. 13d. As demonstrated, the signal-to-noise ratio of the reconstructed signal is significantly improved. Specifically, the signal-to-noise ratio of the reconstructed signal is higher that the signal-to-noise ratio of the original, noisy signal by 7.5 dB.

Discussion

The outer hair cells generate pressure due to their electromotility properties. This pressure acts simultaneously along with the pressure that is produced by the cochlear fluids. In the vicinity of the characteristic frequency, those pressures are in phase for a stimulus at the frequency of the characteristic frequency, and yield a significant enhancement in the basilar membrane motion. On the other hand, the response to stimuli that are not equal to the characteristic frequency is reduced, because the contributions are not in phase.

The outer hair cells are known to be sensitive to metabolism, efferent stimulation etc. [Ulfendahl, M., "Mechanical responses of the mammalian cochlea," 1997, Progress in Neurobiology 53, 331-380]. In the present model their mode of activity is characterized by a the density parameter $\gamma$, which can vary along the cochlear partition. $\gamma=0$ characterizes a cochlea having no active outer hair cells, while $\gamma=1$ characterizes a non realistic cochlea whose basilar membrane motion reaches infinity.

The main effect of the outer hair cell activity is to enhance the cochlear displacement and velocity at the vicinity of the characteristic frequencies. Moreover, this enhancement is mostly significant for frequencies above 1 kHz (the cutoff frequency of the OHC membrane). Thus, changes in $\gamma$, cause a decrease in the enhanced basilar membrane motion. Simulations of audiograms for normal ears and ears with outer hair cells loss, were obtained on basis of the basilar membrane velocity. The simulation results revealed the following observations: (i) typical audiograms with high frequency loss were obtained when density parameter decreased at the basal part of the cochlear partition; (ii) Phonal trauma typical audiograms were obtained when the density parameter was random along the cochlear partition; and (iii) the maximum threshold shift that was obtained due to outer hair cells loss was about 60 dB at 4 kHz.

Noise-induced hearing loss is typically presented by an audiogram whose maximum threshold is obtained at 4 kHz, similar to the simulated audiograms with random $\gamma$. That phonal trauma can thus be characterized by a random loss of outer hair cell along the entire cochlear partition. This description of noise-induced cochleae is not compatible with animal studies on noise trauma. In most studies on noise trauma [Liberman, M. C. and Mulroy M. J., "Acute and chronic effects of acoustic trauma. Cochlear pathology and auditory nerve pathophysiology," 1982, New prespective on noise-induced hearing-loss, R. P. Hamernik, d. Henderson and R. Salvi, editors, Raven, New York, pp. 105-134.; Maison, S. F. and Liberman, M. C., "Predicting vulnerability to acoustic injury with a noninvasive assay of olivocochlear reflex strength," 2000, J. of Neoroscience, 2000, 20(12), 4701-4707], animals were exposed to a narrow-band noise signals, and the outer hair cells loss was especially found at cochlear locations whose characteristic frequencies were equal or an octave above the noise exposure. Such simulations of outer hair cells loss also produce similar audiograms.

However, the assumption of random loss of outer hair cells along the cochlea seems to be more realistic, since in humans the loss of sensitivity in 4 kHz was found independently of the type of the noise exposure [Saunders, J. C., Dear, S. P., Schneider, M. E., "The anatomical consequences of acoustic injury: A review and tutorial," 1985, J. Acoust. Soc. Am. 78, 833-860; Moore, B. C. J., "Cochlear Hearing Loss," 1998, Academic Press].

Hearing loss due to advanced age are typically characterizes by high frequency hearing loss. This type of audiograms is predicted by the present model when outer hair cell loss is considered in particularly at the basal part of the cochlea. Studies on cadavers' cochlea indicate that indeed that outer hair cells loss in the basal part is more frequent than in the apical part of the cochlea [see, e.g., Saunders et al., 1985, supra].

The solutions presented in the present example paper allow testing the predictions of the present model for known nonlinear phenomena such as two-tone suppression, combination tones and cochlear otoacoustic emissions. Hearing-impaired people who suffer from outer hair cells loss show a significant degradation in the performance of all those nonlinear phenomena.

Example 3

Psychophysical Tests

The purpose of the experiment of the present example is to evaluate the benefit of the reconstructed signals to different subjects' population. The experiment consists of "word identification" in an open-set.

Subjects

Four groups of subjects with at least 10 subjects in each group were tested:

(i) Normal hearing (control group), which consisted volunteers that match in age the other tested groups.

(ii) Traumatic impaired hearing, consisted of subjects following trauma such as soldiers, blast injuries, which usually suffer from inability to suppress noise, and their audiogram show a significant increase in threshold at 4 kHz. Their hearing loss is frequently defined as sub-clinical, and therefore they do not wear hearing aids.

(iii) Impaired hearing using conventional analog or digital hearing aids. These subjects (with hearing loss of up to 60 dB) enjoy amplification, filtration, and amplitude limitation (compression) capabilities, common to most conventional hearing aids.

(iv) Impaired hearing using cochlear implants (CI). These patients with profound hearing loss (>90 dB) suffer from severe damage or loss of outer hair cells at different regions along the cochlea. The basic principle behind the CI is translation of incoming acoustic waves to electrical waveforms that are applied directly to the afferent nerve axons, bypassing the entire stimulus-encoding machinery of the inner ear.

Experimental Protocol

Each subject has first passed a standard audiometric test procedure. In the normal group only subjects with less than 10 dB hearing loss were included in the study. The hearing of the patients with hearing aids or CI were assessed with and without their aid.

The main psychoacoustical test is word recognition in an open-set. Subjects are introduced randomly with words chosen from a database that is described below. The levels of the tested words were adjusted for comfortable hearing, but no more than 50 dB above threshold. The experiments took place in a sound proof room located in the "Auditory Signal Processing Laboratory" in Tel Aviv University. Each subject was tested in 6 to 10 experimental sessions of 30 words each. Following each word, the subject was asked to type the word he/she heard on a keyboard or by using a virtual keyboard upon a PC monitor. In case the subject could not recognize the word, he/she could use a special key to indicate "unrecognizable."

Data Base

The principal database consists of the Hebrew adaptation to the AB List (HAB). The AB list, a set of monosyllabic real words, comprises consonant-vowel consonant (CVC) words. The list was designed so that the different phonemes in English shall be equally distributed throughout the entire list [Boothroyd, A, "Developments in speech audiometry," 1968, British journal of audiometry (formerly sound). 2, 3-10]. The AB list is commonly used in hearing tests as it reduces the effect of word frequency and/or word familiarity on test scores. Corresponding lists re produced for other languages and accents [see, e.g., Purdy, S C, Arlington, B. and Johnstone, C., "Normative Data for the New Zealand Recording of the CVC (Revised AB) Word List," 2000, New Zealand Audiological Society, Bulletin 10(2):20-29]. The HAB list was designed for Hebrew natives, and it consists of 15 lists of 10 monosyllabic words such as "sir", "kir" [Kishon-Rabin, L., Personal communication: Faculty of medicine, communication disorders, 2002, Tel-Aviv University, Israel]. The HAB list was recorded by a single female speaker and a single male speaker with a sampling ate of 44.1 kHz. This list is commonly used in hearing tests for clinical evaluation in Israel.

The goal of the experiments was to test the subjects' ability to recognize words in noisy environments. To this end, either a Gaussian white noise or speech-like noise was added to the HAB words in various signal-to-noise ratio from −6 dB to +9 dB in increments of 3 dB. The most common complain of hearing-impaired is the difficulty to understand speech in the presence of speech-like noise such as Cafeteria noise.

Figure 13:
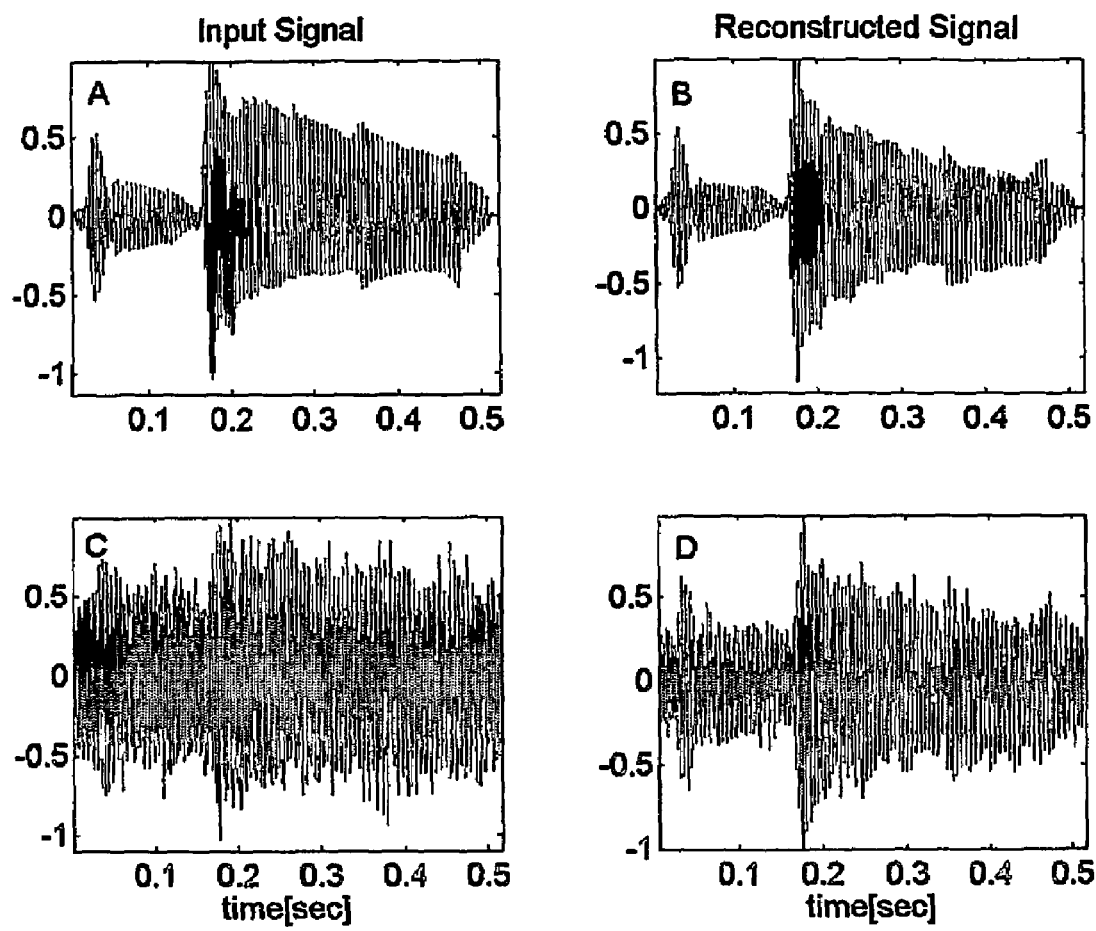

The clean and noisy HAB lists were band-pass filtered between 500 Hz and 8 kHz. The filtered lists were applied to the cochlear model and the reconstruction algorithm. An example of an HAB word that is included in the data base is shown in FIG. 13, above. The entire database consisted 4 lists of 150 words each (male, female, original and reconstructed) with different SNRs.

Evaluation of the Psychoacoustical Results

Each experimental session includes 15 original words and their correspondent reconstructed words with a given signal-to-noise ratio. Following each session, 2 confusion matrixes were formed, one represented the original words and the other represented the reconstructed word. The confusion matrix is not necessarily a square matrix in case where the listener types a word which is different from one of the "HAB" words, or he/she indicated that the word had been "unrecognizable." The subjects performances were evaluated by calculating the percentage of correct recognition in each of the tested conditions. The errors in the recognition were analyzed in linguistic terms. For clean signals the recognition score for the original and reconstructed signals were similar. For the noisy sessions, the reconstructed words yield better scores than the original noisy words. At the end of the psycoacoustical tests, each subject obtained three scores (Signal score, Noisy Signal score and Reconstructed Signal Noise).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed:

1. A method of identifying patterns in a digitized acoustic signal, the method comprising:
   converting the digitized acoustic signal into a spatial representation being defined by a plurality of regions on a vibrating membrane, each said regions having a different vibration resonance, each said vibration resonance corresponding to a different frequency of the acoustic signal;
   calculating a weight function, said weight function having a spatial dependence being representative of acoustic patterns of each region of said plurality of regions;
   calculating a time-delay function, said time-delay function having a spatial dependence being representative of propagation time of the acoustic signal along said vibrating membrane; and
   using said weight function and said time-delay function for converting said spatial representation into a reconstructed acoustic signal;
   thereby identifying the patterns in the acoustic signal.

2. The method of claim 1, further comprising using said time-delay function for calculating a velocity of said vibrating membrane.

3. The method of claim 2, wherein said step of converting said spatial representation into said reconstructed acoustic signal comprises combining said weight function and said velocity, using a predetermined arithmetic procedure.

4. The method of claim 3, wherein said predetermined arithmetic procedure comprises a scalar product in said spatial representation.

5. The method of claim 3, wherein said predetermined arithmetic procedure comprises:
   (i) weighting said velocity by said weight function, thereby providing a weighted velocity; and
   (ii) integrating said weighted velocity over a surface or a length of said vibrating membrane, thereby providing said reconstructed acoustic signal.

6. The method of claim 3, wherein said weight function and said time-delay function are each independently calculated such that said signal-to-noise ratio of said reconstructed acoustic signal is larger than a signal-to-noise ratio of the acoustic signal.

7. The method of claim 3, wherein said weight function and said time-delay function are each independently calculated such that when the acoustic signal is substantially noise-free, said reconstructed acoustic signal is substantially similar to the acoustic signal.

8. The method of claim 1, wherein said weight function has substantially low values in a first portion of said plurality of regions, said first portion being corresponding to noisy components of the acoustic signal.

9. The method of claim 8, wherein said substantially low values approximately equals zero.

10. The method of claim 8, wherein said weight function has substantially high values in a second portion of said plurality of regions, said second portion being corresponding to components other than said noisy components of the acoustic signal.

11. The method of claim 10, further comprising, for each of said plurality of regions, calculating an energy content of said region.

12. The method of claim 11, wherein said first portion of said plurality of regions is characterized by an energy content which is below a predetermined threshold.

13. The method of claim 11, wherein said second portion of said plurality of regions is characterized by an energy content which is above said predetermined threshold.

14. The method of claim 1, wherein said step of conversion of the digitized acoustic signal into said spatial representation comprises calculating said vibration resonance using an anatomical model of a cochlea.

15. The method of claim 14, wherein said anatomical model of said cochlea comprises a mechanical contribution and an electrical contribution.

16. The method of claim 15, wherein said electrical contribution mimics activity of outer hair cells of said cochlea.

17. The method of claim 16, wherein said electrical contribution is parameterized using a density parameter, said density parameter representing a population density of said outer hair cells on said vibrating membrane.

18. The method of claim 1, wherein said weight function is calculated iteratively.

19. A method of identifying patterns in an acoustic signal, the method comprising:
   digitizing the acoustic signal so as to provide a digitized acoustic signal;
   converting the digitized acoustic signal into a spatial representation being defined by a plurality of regions on a vibrating membrane, each said regions having a different vibration resonance, each said vibration resonance corresponding to a different frequency of the acoustic signal;
   calculating a weight function, said weight function having a spatial dependence being representative of acoustic patterns of each region of said plurality of regions;
   calculating a time-delay function, said time-delay function having a spatial dependence being representative of propagation time of the acoustic signal along said vibrating membrane; and
   using said weight function and said time-delay function for converting said spatial representation into a reconstructed acoustic signal;
   thereby identifying the patterns in the acoustic signal.

20. The method of claim 19, wherein said weight function is calculated iteratively.

21. A system for identifying patterns in an acoustic signal, the system comprising:
   (a) an analog-to-digital unit for digitizing the acoustic signal so as to provide a digitized acoustic signal; and
   (b) a processor, communicating with a memory unit having therein a software apparatus, said software apparatus being configured for converting the digitized acoustic signal into a spatial representation, calculating a weight function and a time-delay function, and converting said spatial representation into a reconstructed acoustic signal;
   said spatial representation being defined by a plurality of regions on a vibrating membrane, each said regions having a different vibration resonance, each vibration resonance corresponding to a different frequency of the acoustic signal,
   said weight function having a spatial dependence being representative of acoustic patterns of each region of said plurality of regions, and
   said time-delay function having a spatial dependence being representative of propagation time of the acoustic signal along said vibrating membrane.

22. The system of claim 21, further comprising a digital-to-analog unit for converting said reconstructed signal into an analog electrical signal.

23. The system of claim 22, further comprising a sound wave generator for converting said analog electrical signal into a sound wave.

24. The system of claim 21, further comprising a display interface for transmitting the acoustic patterns to a display device.

25. The system of claim 21, wherein said processor is operable to calculate a velocity of said vibrating membrane using said time-delay function.

26. The system of claim 25, wherein said processor is operable to combine said weight function and said velocity, using a predetermined arithmetic procedure.

27. The system of claim 26, wherein said processor is operable to weight said velocity by said weight function, hence to provide a weighted velocity, and to integrate said weighted velocity over a surface or a length of said vibrating membrane, thereby providing said reconstructed acoustic signal.

28. The system of claim 21, wherein said time-delay function and said weight function are each independently calculated using a sound wave database.

29. The system of claim 21, wherein said processor is operable to calculate said vibration resonance using an anatomical model of a cochlea.

30. The system of claim 29, wherein said anatomical model of said cochlea comprises a mechanical contribution and an electrical contribution.

31. The system of claim 30, wherein said electrical contribution mimics activity of outer hair cells of said cochlea.

32. The system of claim 31, wherein said electrical contribution is parameterized using a density parameter, said density parameter representing a population density of said outer hair cells on said vibrating membrane.

33. The system of claim 30, wherein said mechanical contribution and said electrical contribution are calculated in the frequency domain representation.

34. The system of claim 30, wherein said mechanical contribution and said electrical contribution are calculated in the time domain representation.

35. The system of claim 21, serving as a component in a hearing aid system.

36. The system of claim 21, serving as a component in a speech recognition system.

37. The system of claim 21, serving as a component in a vocoder.

38. The system of claim 21, serving as a component in a telephone device.

39. The system of claim 21, wherein said weight function is calculated iteratively.

* * * * *